(12) United States Patent
Cummings

(10) Patent No.: US 8,074,638 B2
(45) Date of Patent: Dec. 13, 2011

(54) INFLATABLE SOLAR CONCENTRATOR BALLOON METHOD AND APPARATUS

(75) Inventor: Eric Bryant Cummings, Livermore, CA (US)

(73) Assignee: CoolEarth Solar, Livermore, CA (US)

( * ) Notice: Subject to any disclaimer, the term of this patent is extended or adjusted under 35 U.S.C. 154(b) by 315 days.

(21) Appl. No.: 11/843,531

(22) Filed: Aug. 22, 2007

(65) Prior Publication Data
US 2008/0047546 A1    Feb. 28, 2008

Related U.S. Application Data

(60) Provisional application No. 60/839,841, filed on Aug. 23, 2006.

(51) Int. Cl.
*F24J 2/08* (2006.01)

(52) U.S. Cl. ........ 126/684; 126/569; 126/625; 126/682; 126/690; 126/697; 343/880; 343/907; 343/912; 244/24; 244/31

(58) Field of Classification Search .................. 126/684, 126/569, 714, 584, 625, 690, 624, 682, 570, 126/573, 578, 697; 343/915, 912, 907, 880; 244/31, 24; 136/246
See application file for complete search history.

(56) References Cited

U.S. PATENT DOCUMENTS

| | | | |
|---|---|---|---|
| 2,952,189 A | 9/1960 | Pajes | |
| 3,054,328 A | 9/1962 | Rodgers | |
| 3,056,131 A | 9/1962 | McCreary | |
| 3,125,758 A | 3/1964 | Koehler | |
| 3,326,624 A | 6/1967 | Von Maydell et al. | |
| 4,056,093 A * | 11/1977 | Barger | 126/592 |
| 4,063,676 A | 12/1977 | Lilly | |
| 4,126,123 A * | 11/1978 | Hall | 126/625 |
| 4,262,864 A * | 4/1981 | Eshoo | 244/31 |
| 4,355,628 A * | 10/1982 | Watts | 126/609 |
| 4,364,053 A * | 12/1982 | Hotine | 343/915 |
| 4,404,958 A * | 9/1983 | Boettcher | 126/625 |
| 4,432,342 A * | 2/1984 | Lucas et al. | 126/570 |
| 4,440,149 A * | 4/1984 | Hattan | 126/573 |

(Continued)

OTHER PUBLICATIONS

International Search Report and Written Opinion of PCT Application No. PCT/US07/76670, date of mailing Sep. 16, 2008, 10 pages total.

(Continued)

*Primary Examiner* — Steven B McAllister
*Assistant Examiner* — Avinash Savani
(74) *Attorney, Agent, or Firm* — Kilpatrick Townsend & Stockton LLP

(57) ABSTRACT

Embodiments of the present invention relate to concentrating solar radiation using an assembly of at least one clear and one reflective film that inflates into a shape reflecting parallel rays of light to a concentrated focus in the interior or immediate proximity of the assembly. Embodiments of the present invention can be assembled in a substantially flat stack with bonds or welds between the films, compatible with conventional high-throughput film manufacturing processes. Embodiments in accordance with the present invention may employ external circumferential rings or a "harness" assembly to support and point the balloon against wind forces and the like without severe stress localization. Embodiments in accordance with the present invention may also employ film attachments to facilitate feedthroughs, reduce stress concentrations, and modify the inflated shape. Embodiments in accordance with the present invention may also employ film modifiers, including laminated films, adhesives, printing, etc. to facilitate installation, feedthroughs, and other functions.

19 Claims, 19 Drawing Sheets

U.S. PATENT DOCUMENTS

| | | | | |
|---|---|---|---|---|
| 4,543,945 | A | * | 10/1985 | Hattan .......................... 126/584 |
| 4,672,389 | A | * | 6/1987 | Ulry .............................. 343/915 |
| D310,657 | S | * | 9/1990 | Bradford et al. ............. D13/102 |
| 5,893,360 | A | | 4/1999 | Stoumen |
| 6,897,832 | B2 | | 5/2005 | Essig, Jr. et al. |
| 7,562,493 | B2 | * | 7/2009 | Kassianoff ..................... 52/2.25 |
| 2004/0207566 | A1 | | 10/2004 | Essig, Jr. et al. |

OTHER PUBLICATIONS

China State Intellectual Property Office office action for patent application 200780036805.X (Jul. 12, 2010).

China State Intellectual Property Office office action for patent application 200780036805.X (Jan. 22, 2010).

* cited by examiner

Figures 1 A–E

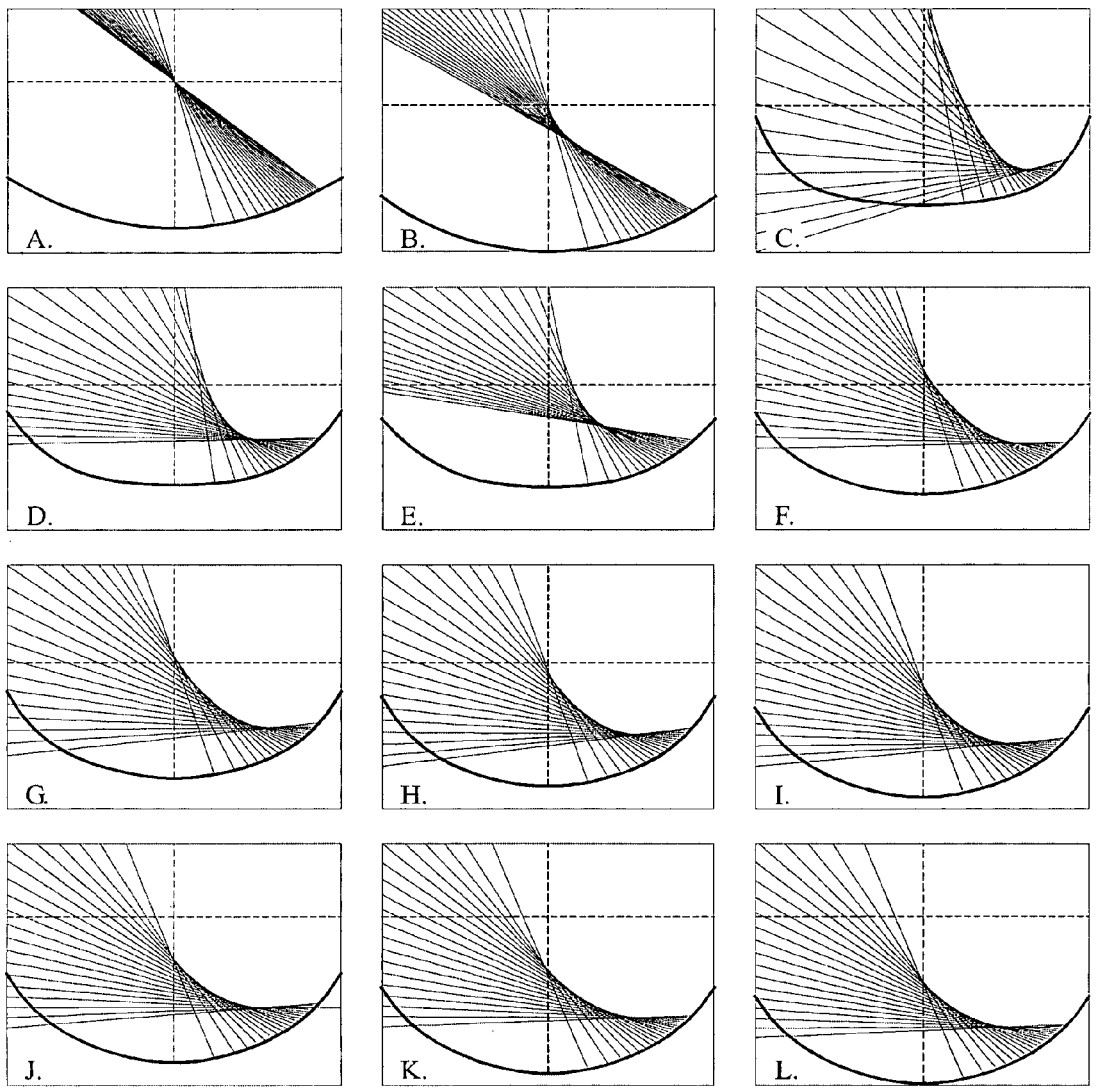
Figures 3 A–L

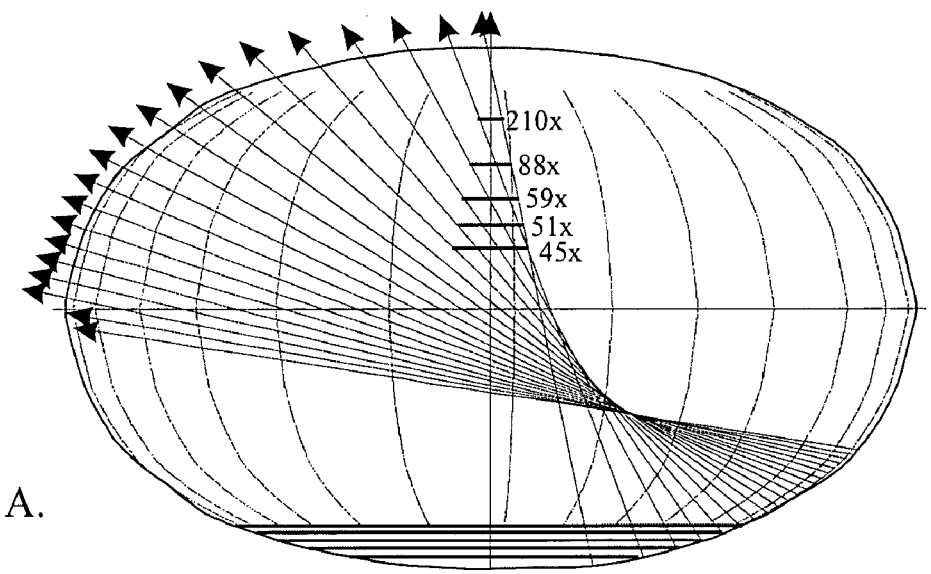
A.
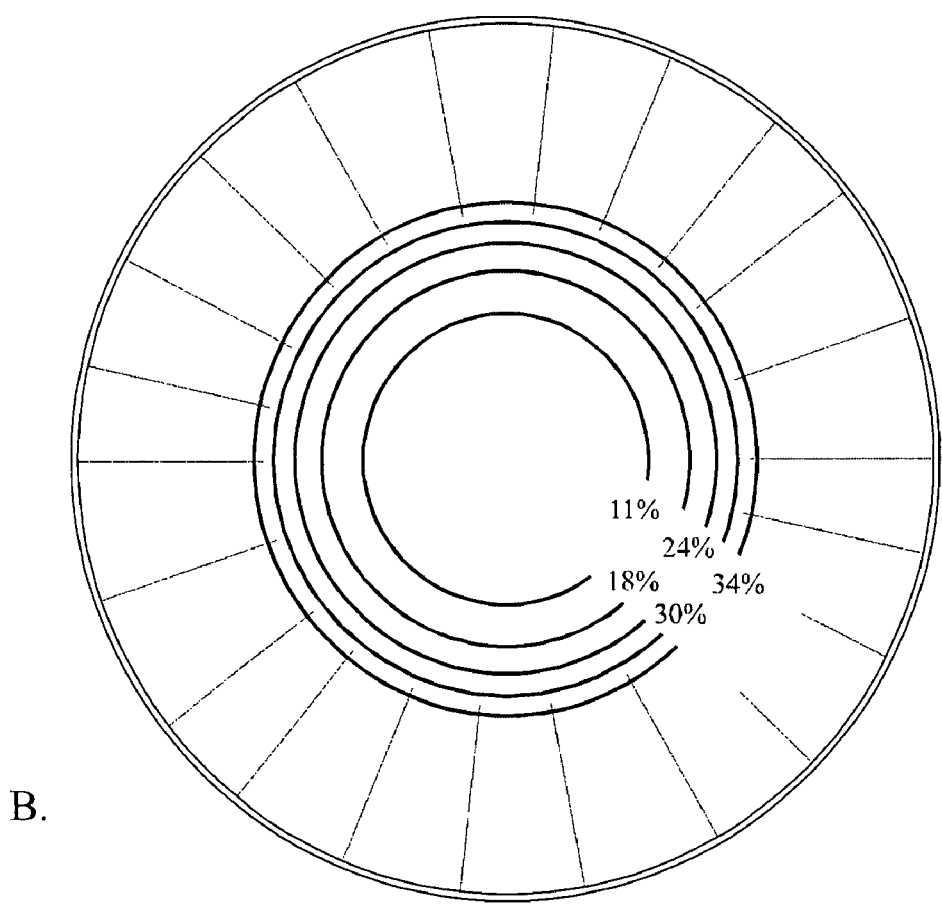
B.
Figures 4 A–B

A.
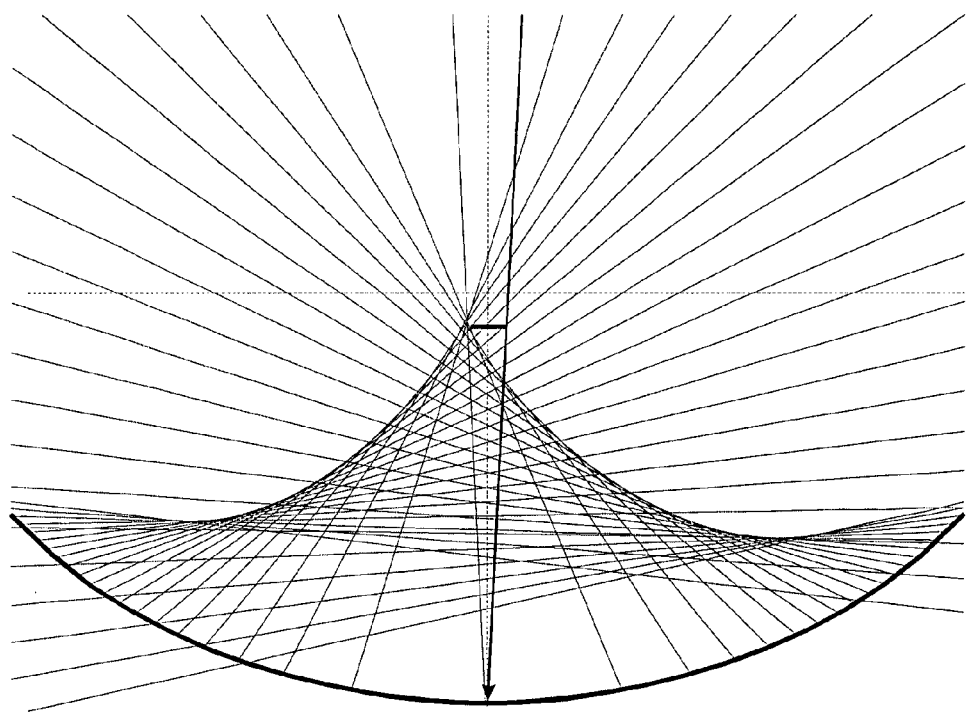
B.
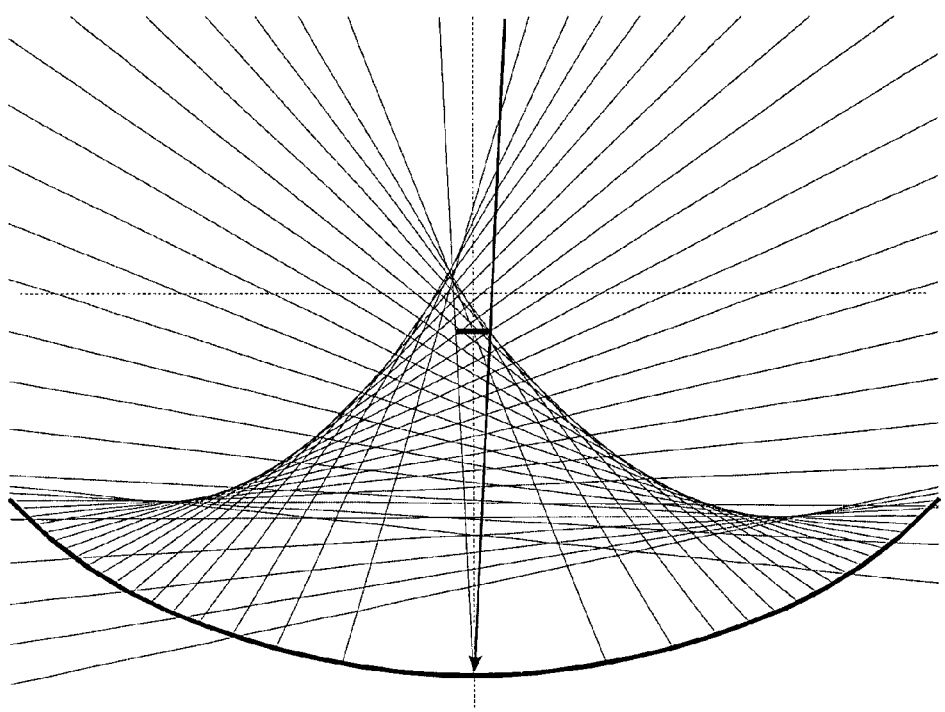
Figures 6 A–B

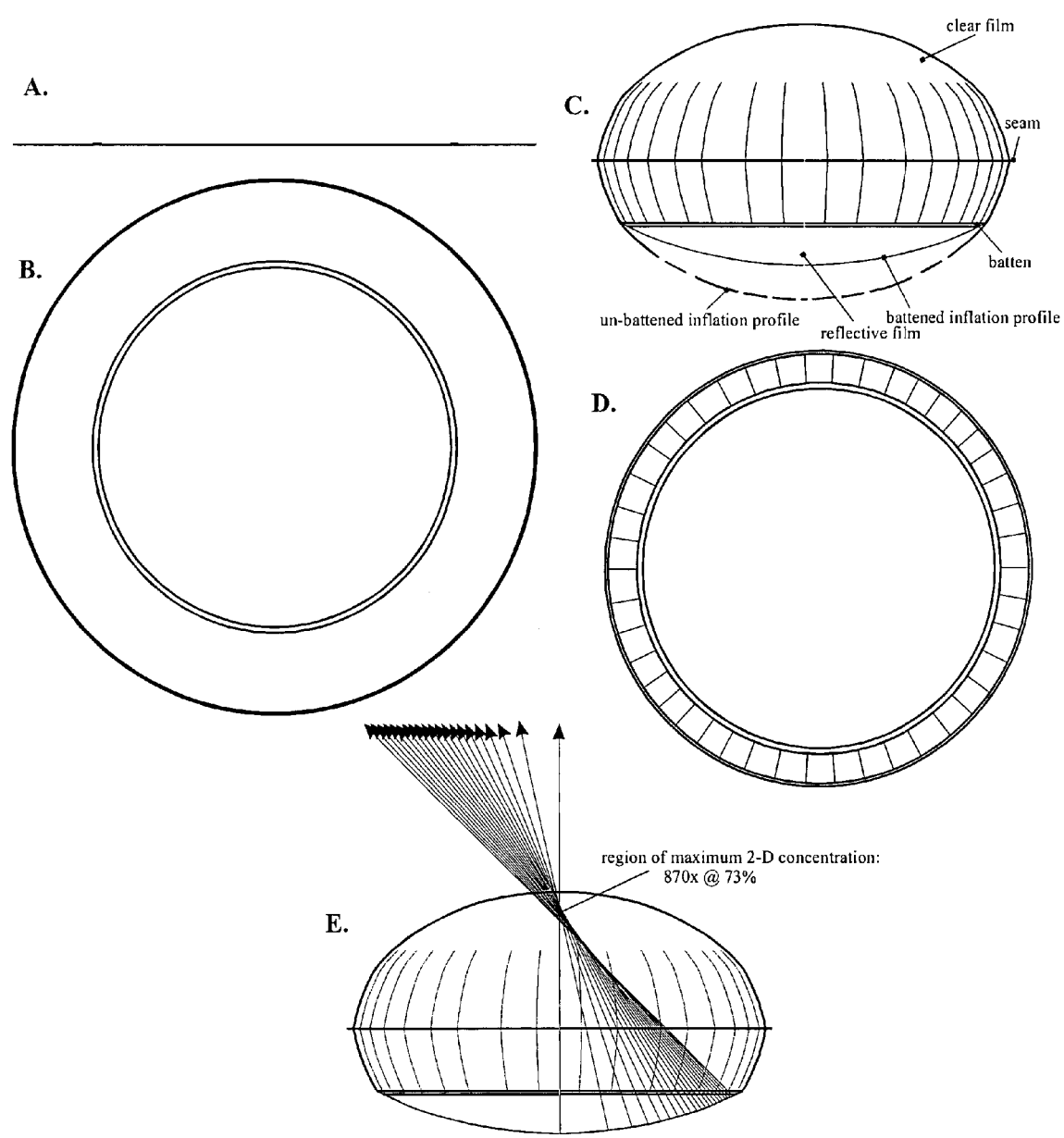
Figures 7 A–E

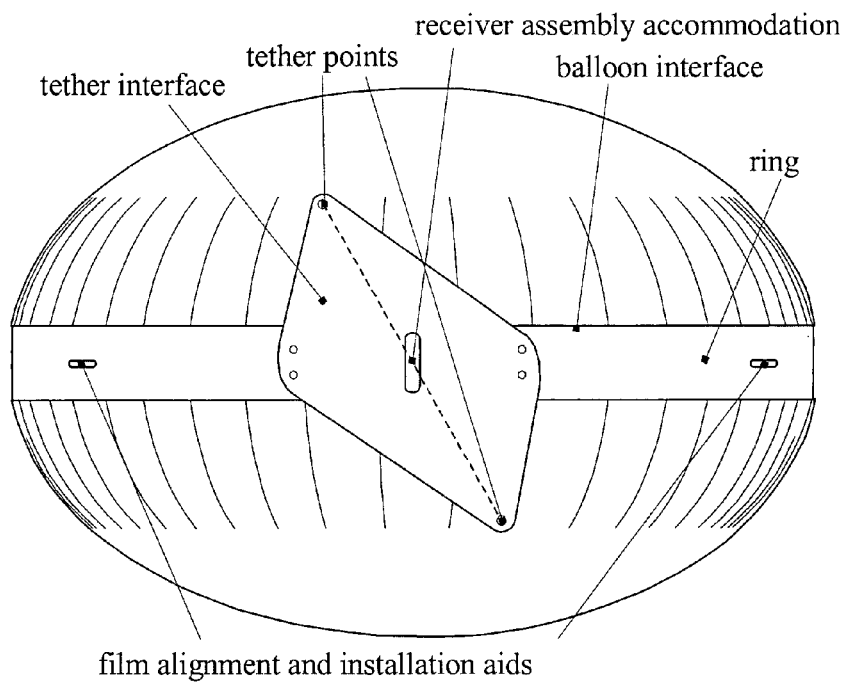
Figure 9
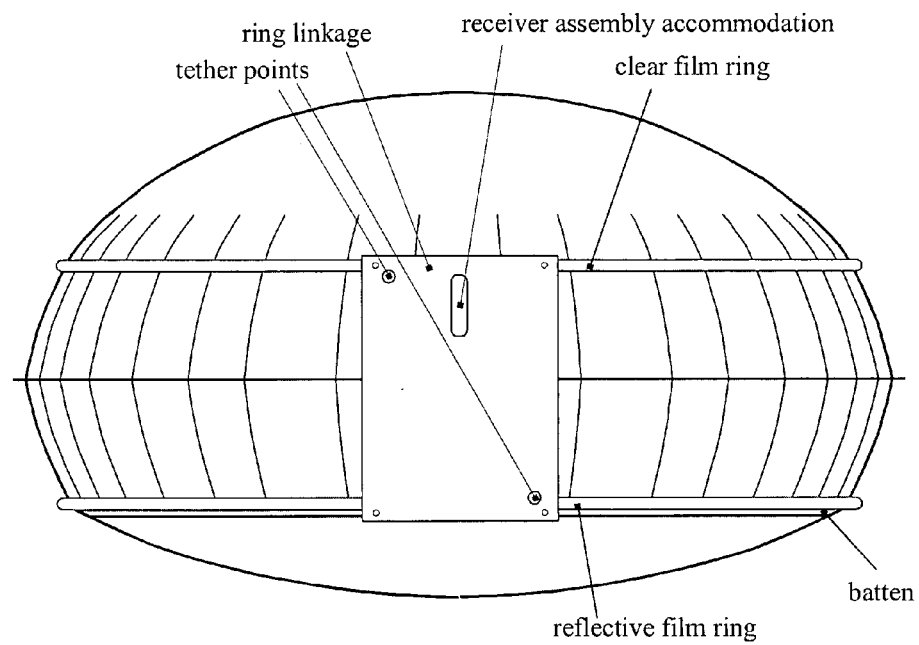
Figure 10
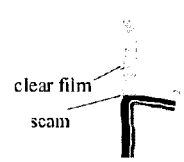

Figures 11 A–C

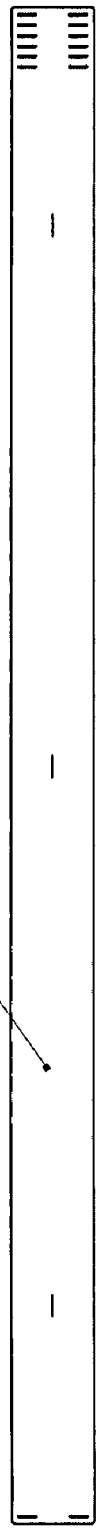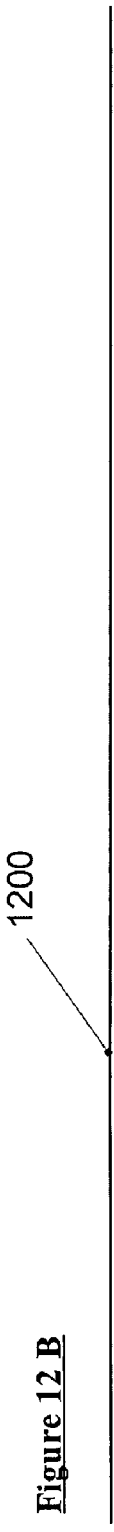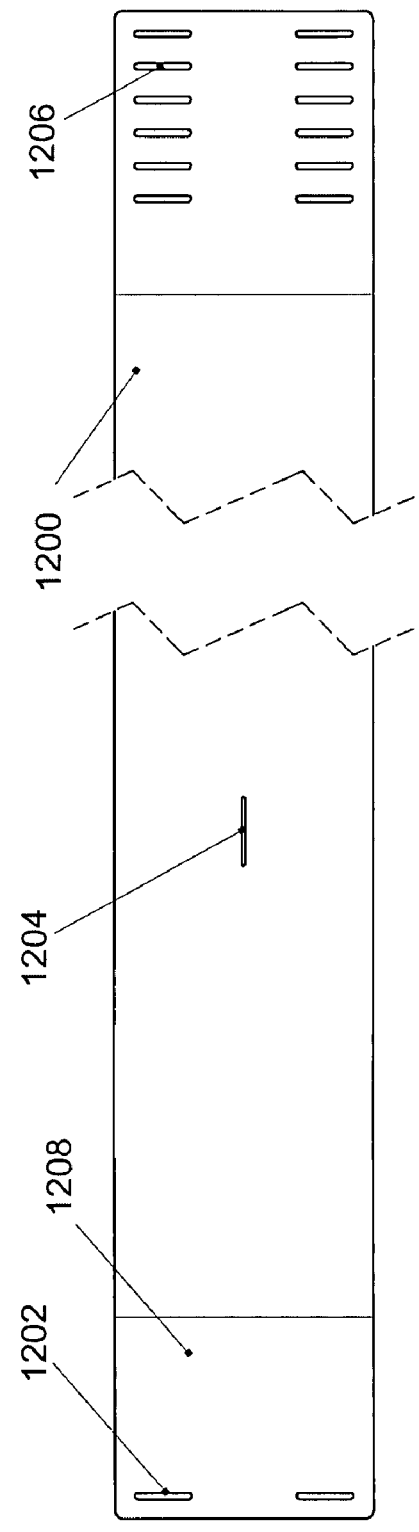
Figure 12 A
Figure 12 B
Figure 12 C

2

INFLATABLE SOLAR CONCENTRATOR BALLOON METHOD AND APPARATUS

CROSS-REFERENCES TO RELATED APPLICATIONS

The instant nonprovisional patent application claims priority to U.S. Provisional Patent Application No. 60/839,841, filed Aug. 23, 2006 and incorporated by reference in its entirety herein for all purposes. The instant nonprovisional patent application is also related to the following U.S. Provisional Patent Applications, each of which is incorporated by reference in its entirety herein for all purposes: Appl. No. 60/839,855, filed Aug. 23, 2006; Appl. No. 60/840,156 filed Aug. 25, 2006; and Appl. No. 60/840,110, filed Aug. 25, 2006.

BACKGROUND OF THE INVENTION

Solar radiation is the most abundant energy source on earth. However, attempts to harness solar power on large scales have so far failed to be economically competitive with most fossil-fuel energy sources.

One reason for the lack of adoption of solar energy sources on a large scale is that fossil-fuel energy sources have the advantage of economic externalities, such as low-cost or cost-free pollution and emission. Political solutions have long been sought to right these imbalances.

Another reason for the lack of adoption of solar energy sources on a large scale is that the solar flux is not intense enough for direct conversion at one solar flux to be cost effective. Solar energy concentrator technology has sought to address this issue.

Specifically, solar radiation is one of the most easy energy forms to manipulate and concentrate. It can be refracted, diffracted, or reflected, to many thousands of times the initial flux, utilizing only modest materials.

With so many possible approaches, there have been a multitude of previous attempts to implement low cost solar energy concentrators. So far, however, solar concentrator systems cost too much to compete unsubsidized with fossil fuels. While inflated mirrors and concentrators are known in the art, their architecture, method of assembly, performance, and difficulty of maintenance render them unsuitable for large-scale solar farming.

In addition, conventional concentrators require significant installation and alignment. Such designs are material intensive in part they must resist deflections under severe wind loads. Conventional solar energy concentrators must also endure exposure to sun, rain, pollution, dirt, wind-blown sand, insects, animals, etc. and are often specified to remain efficient for long periods between maintenance.

Accordingly, there is a need in the art for designs for solar concentrators which are easily manufactured, installed, and maintained.

BRIEF SUMMARY OF THE INVENTION

Embodiments in accordance with the present invention generally relate to solar radiant energy concentration. Particular embodiments of the present invention relate to concentrating solar radiation using an assembly of at least one clear and one reflective film that inflate into a shape reflecting parallel rays of light to a concentrated focus in the interior or immediate proximity of the assembly. Embodiments in accordance with the present invention can be assembled in a substantially flat stack with bonds or welds between the films, compatible with conventional high-throughput film manufacturing processes. Embodiments in accordance with the present invention may employ external circumferential rings or a "harness" assembly to support and point the balloon against wind forces and the like without severe stress localization. Embodiments in accordance with the present invention may also employ film attachments to facilitate feedthroughs, reduce stress concentrations, and modify the inflated shape. Embodiments in accordance with the present invention may also employ film modifiers, including laminated films, mesh, fabric, metal films, adhesives, printing, etc. to facilitate installation, feedthroughs, modify inflated film shape to adjust optical properties, and other functions. Embodiments in accordance with the present invention may also employ temporary or permanent film distortion to tailor the inflated film shape.

Embodiments of solar energy concentration approaches according to the present invention may employ minimum-material shapes and architectures so that concentrators do not require excessive material. Moreover, embodiments of the system architecture may provide for elastic flexure under severe loads, rather than plastic bending or buckling. The conventional approach to mounting solar modules is to use an extended truss made of beams and extrusions that support compressive loads and consequently require a significant amount of material to resist bucking and distortion under wind loading, or completely separate mounts, each individually tied to a solid surface, e.g., ground via concrete pads. Such conventional mounts may offer disadvantages in that they:

- may require excessive material to support tensile loads and prevent deflection;
- may require redundant mounting and pointing apparatus; and/or;
- may require excessive preparation of or access to the terrain below the modules, impacting the use of land below the modules and potentially increasing the environmental impact of solar installations Embodiments of the present invention accordingly employ a plurality of solid, high-aspect-ratio tensile members, herein called cables that may comprise wires, extrusions, wire rope, natural or synthetic rope, weaves, fiber-reinforced composites, fiber-reinforced ropes, cable assemblies, and the like. As used herein, the term "fastened" means at least partly constrained from relative translation in at least one direction or partly constrained from relative rotation in at least one direction over at least a finite range of motion. The mechanism that tensions the ends of the cables should be able to support the cable tension along with any lateral forces or increased tensile forces produced by the wind. One embodiment of such a mechanism is a truss which uses the cables as tensile elements and a minimum number of compressive elements to perform its function, since that arrangement should provide for minimizing the number of cable attachments and the truss material, and therefore minimizing cost.

The amount of material in a design is substantially dictated by stability specifications in the normal operating regime. To offset labor costs, embodiments according to the present invention employ novel designs to simplify and speed maintenance.

The minimum-material structure according to embodiments of the present invention, employs inflation air as a primary structural element of a concentrator, allowing the use of concentrator materials that are far thinner than any conventional concentrator.

The architecture according to embodiments of the present invention, also exacts economic externalities that have no undesirable consequences. Specifically, air is one of the largest materials by weight in systems according to embodiments of the present invention. Yet air is an abundant and free compound requiring no mining or distribution.

An embodiment of an apparatus in accordance with the present invention, comprises, an upper elliptical film panel configured to transmit incident light; and a lower elliptical film panel configured to reflect incident light and having a circumference joined substantially to a circumference of the upper film panel. Inflation of the joined upper and lower film panels creates a balloon that reflects incident light transmitted through the upper film to a focal point inside the balloon.

An embodiment of a method in accordance with the present invention of collecting solar energy, comprises, reflecting light incident to a clear upper panel of an inflated balloon, on a focal point interior to the balloon utilizing a reflective lower panel of the balloon.

An embodiment of an inflated balloon in accordance with the present invention, comprises, an upper elliptical film panel configured to transmit incident light, and a lower elliptical film panel configured to reflect incident light and having a circumference joined substantially to a circumference of the upper film panel, such that an inflation pressure imparts a rigidity to the balloon ensuring that incident light transmitted through the upper film is reflected to a focal point inside the balloon.

An embodiment of a method in accordance with the present invention of fabricating a solar power collector, comprises, bonding a circumference of an upper circular film panel configured to transmit incident light, with a circumference of a lower circular film panel configured to reflect incident light, in order to form a balloon. Gas is introduced between the upper and lower films to inflate the balloon, such that incident light passing through the upper film panel is reflected by the lower panel to a focal point located inside the balloon.

These and other embodiments of the present invention, as well as its features and some potential advantages are described in more detail in conjunction with the text below and attached figures.

BRIEF DESCRIPTION OF THE DRAWINGS

FIGS. 3A-L show trajectories of rays reflected from incident rays (not shown) that are parallel to the vertical axis for various balloon surface profiles:

FIG. 4A shows a flat-receiver concentration factor of a balloon inflated to ~1.5% strain.

FIG. 4B shows a plan-view of the flat-receiver collection efficiency of a balloon inflated to ~1.5% strain.

FIG. 6A shows a balloon that has a 5% pointing slope error. FIG. 6B shows the same balloon, pointing error, and receiver as in FIG. 6A at lower inflation pressure.

FIG. 7A shows a simplified elevational view of an uninflated solar energy concentrator having a batten in accordance with the present invention.

FIG. 7B shows a simplified plan view of the uninflated solar energy concentrator having a batten of FIG. 7A.

FIG. 7C shows a simplified elevational view of an inflated solar energy concentrator having a batten in accordance with an embodiment of the present invention.

FIG. 7D shows a simplified plan view of the inflated solar energy concentrator having a batten of FIG. 7C.

FIG. 7E shows a simplified schematic view of a ray trace from the battened reflector on the inflated balloon.

FIG. 9 shows elements of a harness assembly in accordance with an embodiment of the present invention.

FIG. 10 shows an embodiment of a two-ring harness in accordance with the present invention.

FIGS. 12A-C show views of a flexible band according to an embodiment of a harness assembly.

DETAILED DESCRIPTION OF THE INVENTION

Figure 1:
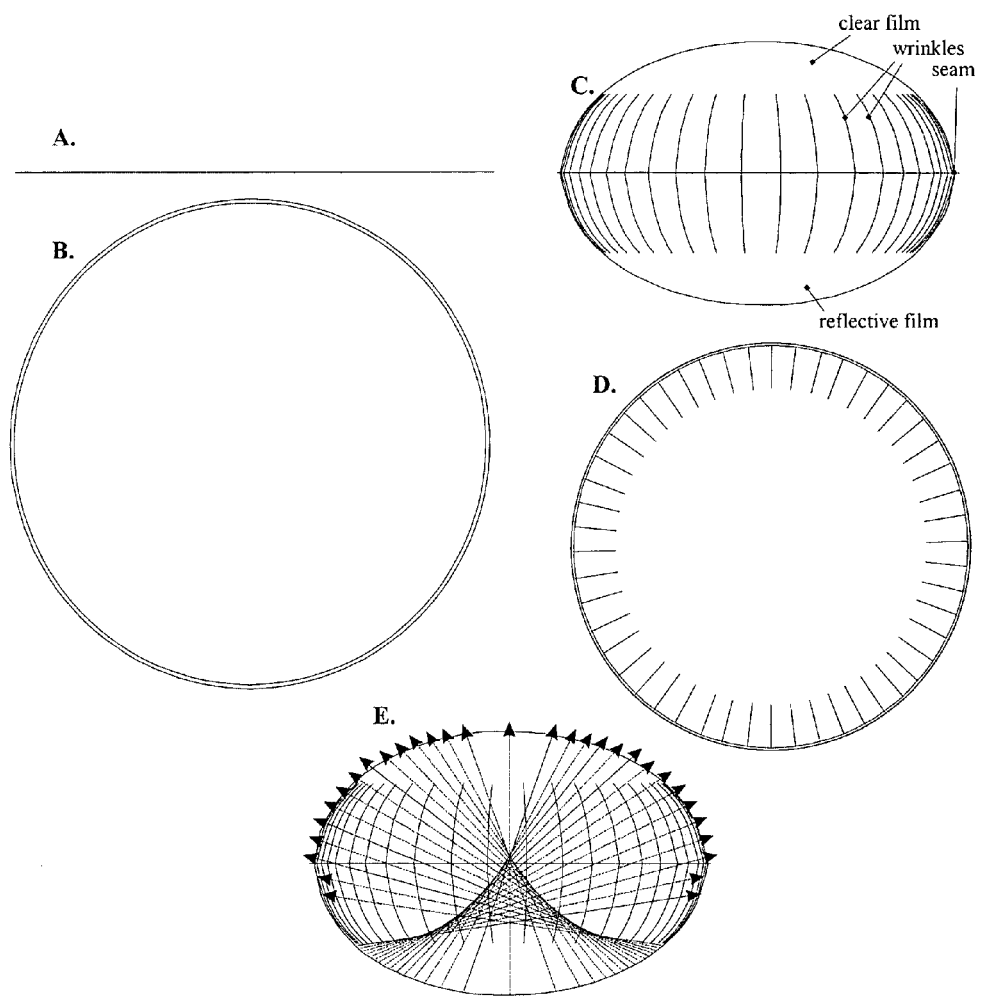
FIG. 1A shows a simplified elevational view of an uninflated solar energy concentrator in accordance with an embodiment of the present invention.
FIG. 1B shows a simplified plan view of the uninflated solar energy concentrator of FIG. 1A.
FIG. 1C shows a simplified elevational view of an embodiment of an inflated solar energy concentrator in accordance with an embodiment of the present invention.
FIG. 1D shows a simplified plan view of the inflated solar energy concentrator of FIG. 1C.
FIG. 1E shows a simplified schematic view of the trace of reflected light rays from incident rays parallel to the inflated balloon axis.

Embodiments in accordance with the present invention generally relate to solar radiant energy concentration. Particular embodiments of the present invention relate to concentrating solar radiation using an assembly of at least one clear and one reflective film that inflates into, and maintains a shape reflecting parallel rays of light to a concentrated focus in the interior or immediate proximity of the assembly, primarily via inflation pressure provided by a fluid such as air, rather than rigidity of at least one film. In accordance with one embodiment, the present invention can be assembled in a substantially flat stack with bonds, adhesives, or welds circumferentially between the films, compatible with conventional high-throughput film manufacturing processes.

Alternatively, films can be joined by bonds, adhesives, welds, friction, and the like via an intermediary ring. Under inflation pressure, elastic or a combination of plastic and elastic film deformation produces the required surface geometry of one or both of the clear and reflective surfaces. Alternatively or in combination with inflation pressure, plastic film deformation may be produced in part by applying air pressure differentials, mechanical forcing, stamping, or embossing of fine-pitched "wrinkles" or larger scale indentations to at least one film or by inflation of the film assembly.

Embodiments in accordance with the present invention may employ external circumferential rings or a "harness" assembly to support and point the balloon against wind forces and the like without severe stress localization. In particular, use of a harness in conjunction with a tether in contact with a rigid positioner, may serve to distribute stress from the rigid positioner contact over the plurality of points of contact between the harness and the balloon. Of course, the harness may be connected with multiple tethers, each having at least one rigid positioner.

Embodiments in accordance with the present invention may also employ film attachments to facilitate feedthroughs, reduce stress concentrations, and modify the inflated shape. Embodiments in accordance with the present invention may also employ film modifiers, including laminated films, mesh, fabric, metal film, adhesives, printing, etc. to facilitate installation, feedthroughs, and other functions.

Distinguishing characteristics of certain embodiments in accordance with the present invention are:
1. the concentrator balloon is a stack of at least one clear and one reflective film;
2. the concentrator balloon is constructed from flat stock and is substantially flat when uninflated and during manufacturing—in accordance with alternative embodiments the balloon may be semi-rigid and be constructed from stock that is not flat;
3. when inflated, a strain of the films between 1% and 45% produces the desired reflector shape; and
4. when inflated, the region of peak light concentration is internal to the films.

One objective of certain embodiments in accordance with the present invention is an economical and scalable solar concentrator to be incorporated into systems for solar energy farming. These concentrators are decomposed into an inflatable film concentrator, an element that requires periodic or occasional replacement, a concentrator harness that has an unlimited or many-year service life, and a tether to a solar tracker mechanism. Installation jigs and tools are used to install and service many concentrator systems over a long period of time. This decomposition allows the simultaneous minimization of risk and cost. For example, the inflated films naturally degrade over time from exposure to the environment, animals, etc. Embodiments in accordance with the present invention seek aggressively to minimize the material use and cost, assembly cost, and distribution cost of its films as well as the environmental impact over its life cycle. The harness is designed for low cost and rigidity, and ease of distribution, installation, and maintenance, but with extra attention to lifetime and survivability. Installation and service jigs and tools (not disclosed) will reduce labor costs and the unit cost and complexity of the films and harness.

Inflatable Concentrator

An inflatable concentrator in accordance with an embodiment of the present invention uses an assembly arrangement designed to inflate to a substantially elliptical or ovular axial cross-section. The eccentricity of the cross-section is such that the ratio of the major axis length to minor axis length is preferably less than 10:1 and most preferably from a strength and material usage standpoint nearly equal to 1. Higher eccentricities may be favored, for example, to allow larger area balloons to be constructed from plastic or metal rolls having a limited width or to allow denser arraying of balloons without the balloons excessively shadowing each other. For simplicity, the remainder of the discussion uses the language of a balloon of circular cross-section, but the extension to a more general elliptical or ovular geometry is intended.

In principle, any fluid may be used to inflate concentrators according to embodiments of the present invention. Fluids favorable for use according to embodiments of the present invention are generally substantially transparent to light over the spectrum range of interest.

The weight of a dense fluid could affect the concentrator profile. To avoid distortions of the concentrator with dense fluids, the concentrator may be immersed in a fluid of the same or similar density. Positive or negative buoyancy could alternatively be exploited to affect the concentrator shape or affect other aspects of the performance. In some cases, fluids, including gases having dissimilar densities, could be used to stabilize the concentrators through the action of sloshing.

In some embodiments, the index of refraction of one or more inflation fluids can affect optical behavior of the concentrator. In many instances, it is anticipated that concentrators according to embodiments of the present invention will be inflated with substantially air or other environmentally-available gases. This inflation may take place after one or more drying processes.

In accordance with certain embodiments, it is also possible that chemicals will be added to the inflation fluid to effect a function. Examples of such functions performed by such added chemicals include plasticizing or repairing the polymer or metal surfaces, coating, resealing, revealing leaks, and other functions. There is no limit on the nature of the fluid or fluids that provide the inflation pressure.

Balloons in accordance with embodiments of the present invention may be inflated during operation to average elastic and plastic film strains between approximately 1 and 34% and peak strains between 1 and 45%. At these strains, the outer approximately 10-40% of the balloon films can spontaneously form (via a process of wrinkling, buckling, and elastic deformation), an approximately substantially cylindrical arc that gives the balloon depth in the axial direction, allowing the focus of the balloon to lie internal to the balloon, and providing structural rigidity to the balloon films and other equipment such as the harness. Alternatively, all or part of this region could be produced via plastic deformation of the films.

Inflation pressure on this outer roughly cylindrical region may also pull radially on the inner approximately 30-50% of the film. In some embodiments, this radial pulling provides a force, supporting it so that it an inner region stretches and deflects to a concave substantially paraboloidal shape for high concentration of solar energy. No extra assembly or bonding or mechanical parts are needed to produce or maintain this shape.

A receiver is the recipient of collected radiation. Examples of receivers are devices that absorb or otherwise convert radiation to another form of energy, e.g., heat, electricity, chemical, or mechanical energy, or imaging, partially imaging, and nonimaging optical elements. For example, a receiver may comprise one or more mirrors, refractive optics, Fresnel optics, diffractive optics, fiber-optic bundles, light pipes, or array of light pipes, solar energy absorbers, photovoltaic cells or modules, photochemical or photothermochemical processing apparatus, and hybrids of these as well as other devices that relay, convert, or utilize solar electromagnetic radiation well known in the art.

The region of the films through which light passes and reflects efficiently onto the receiver is called herein the collector area. For a large receiver or a receiver having a specifically tailored shape, this area approximately coincides with the wrinkle-free extent of the balloon. For small or flat receivers, e.g., most photovoltaic receivers, the collection efficiency varies inversely with the concentration factor. For example, at a nominal average strain of an initially flat film ~10%, paraxial light falling on 32% of the axial cross-section of the balloon can be captured in a ~180× concentrated spot while the maximum concentration at 51% of axial cross-section is ~16×.

The collection efficiency and concentration factor can be simultaneously improved by bonding or installing a ring that is capable of resisting buckling under weak compressive loads, herein called a "batten," onto the reflective film at a circumference of between 30 and 80% and nominally ~50-60% of the uninflated initial film circumference. When inflated, the batten functions with several improvements over known art.

First, because the film outside the batten can wrinkle to form a largely cylindrical extension of the balloon, the focus of the inflated balloon can be internal to the balloon without requiring super-elastic strain or plasticity of the reflective film. Second, the bond strength and compressive strength required of the batten can be much smaller than for a circumferential ring which must support the full radial inflation loads, allowing the batten to use minimal material.

A third improvement exhibited by embodiments in accordance with the present invention is that because the balloon derives most of its stiffness from the mildly oblate spheroidal shape maintained by the inflation force and elasticity of the films, the batten only needs to resist high-order buckling instabilities. This is unlike the conventional circumferential ring, which must resist low-order instabilities that are directly driven by wind loading.

For example, embodiments in accordance with the present invention may employ balloons whose rigidity is maintained entirely or partially by an inflation pressure inside the balloon. According to one embodiment, an amount of half or greater of the overall rigidity of the balloon is attributable to inflation pressure. This may be measured by measuring the peak magnitude of deflection of the concentrator reflector subject to a wind force for wind blowing along a diameter of a tethered concentrator; wind blowing directly normal to the diameter, coming from the reflector side; wind blowing directly normal to the diameter, coming from the transparent side; and wind blowing at 45 degrees from these directions. According to this embodiment, the maximum peak displacement for these loadings is at most half that measured for the same concentrator having no inflation pressure. Alternatively, one may perform the same displacement tests under loads provided by static dead weights distributed substantially uniformly across at least one half the balloon vertical cross-section in the various orientations.

A fourth improvement offered by embodiments of the present invention, is that the battened balloon designs using strains <10%, can provide internally focused concentration of 870× at 73% collected axial cross-section and 1.2 k× at 61% collected axial cross-section. The cost of this improved performance is additional manufacturing or installation complexity and additional material usage, although the balloons can be designed to support reusable battens.

The balloon design can be manufactured using well-established and highly-automated techniques. The resulting balloon films can be stacked and distributed efficiently, especially the batten-less balloons or balloons that employ a separate, re-usable batten.

Embodiments in accordance with the present invention produce an internal focus that can be well separated from the front (clear) film. This arrangement is superior to designs having an external focus for several reasons.

First, inflatable concentrators can produce peak concentration factors exceeding 1000-2000×. At these fluxes most light-absorbing, combustible materials will spontaneously burn unless they are actively cooled. An accidental misalignment or momentary mispointing of a single concentrator could start a wildfire or building fire. Simply leaving the concentrator inflated without the tracking mechanism on is dangerous. The front film of the balloon design of the present invention prevents inadvertent exposure of anything outside the balloon to dangerously concentrated light.

Second, the light passes only once through the clear film. A pristine cover film will reflect, absorb, and scatter approximately 10% of the incident light. With dust buildup and wind-related sand blasting, the amount of scattered and absorbed light could be considerably higher. An externally focused concentrator passes light twice through this film, increasing loss over that of an internally focused concentrator.

Finally, the receiver of an internally focused concentrator is located between the clear and reflective film in a region that is generally protected against insects, elements, dust, and other potential hazards, nuisances, and sources of loss.

Several aspects of having an internal focus require careful consideration. First, at least one element must generally be contained inside the balloon assembly when it is inflated to capture or channel the concentrated light. This can be resolved through a combination of balloon design and the use of a "harness" as described later.

Second, only natural convection is available to cool an internal receiver unless active cooling or stirring is employed. The cooling problem will generally need to be resolved in the receiver system design. Most receivers will already need to operate safely in still air. However, the need to limit the temperature of plumes of hot gas from the receiver on the films may impose additional constraints on the receiver design.

Harness

The concentrator balloons are to be held and pointed accurately at the sun against wind, gravity, inertial forces and the like. Tabs and reinforcement grommets may be employed on the periphery of the films as mounting and pointing elements. Such a mounting scheme is ubiquitous with inflatable and fabric assemblies, and is obvious to one skilled in the art.

Tabs and reinforced mounting holes could be employed to point and restrain the inflatable concentrator in the present invention. However this mounting arrangement may produce stress concentrations that lower the maximum safe wind speed and can distort the balloon shape, lowering the efficiency under wind loading. These stress concentrations can be compensated or reinforced, but doing so complicates the assembly and design, particularly in light of the importance of the strained shape of the balloon on the concentrator performance.

Accordingly, a preferred design element that facilitates pointing and mounting is an external ring of comparatively rigid material that abuts the equatorial circumference or one or more concentric circular regions of the inflated balloon. The ring or "harness" transfers forces to and from the balloon via a combination of friction, adhesion, and cohesion at the interface between the ring and the balloon. This harness distributes localized forces from position- and angle-control apparatus to an extended region of the balloon film and vice versa, providing for the use of thinner films and a less expensive balloon assembly.

The harness in accordance with the present invention should not be confused with conventional rims that operate in compression and are an essential element for establishing the balloon shape. The harness in accordance with embodiments of the present invention generally operates with no compression and possibly a modest tension to provide for improved adhesion or friction with the balloon film and to inhibit buckling of the harness. Unlike the conventional rims, the harness is primarily for mounting, pointing, and film joint reinforcement.

In accordance with one embodiment, the harness, like a barrel hoop, may have little rigidity to radial displacement except for the restoring force provided by the inflation pressure contained within the balloon films. In such an embodiment, this pressure produces tension in the harness that resists buckling and other undesirable harness distortion.

In one embodiment, the harness assembly may be comprised of one or more thin, flexible bands that connect or join mechanically, via fasteners adhesively, by welds, brazes or solders or other joining methods well known in the art to one or more, preferably two, rigid metal pieces or "buckles." A purpose of the buckle is to provide a rigid intermediary between the thin, flexible band that distributes most loads to and from the balloon films and the tracking apparatus or tethers.

In accordance with certain embodiments, the flexible bands pass into mating slots and passages in the buckle that constrain the relative rotation of the band and the buckle. An example of a similar structure is a buckle on an adjustable strap.

An assembled band and buckle can provide for restraining the bands against pulling out of the buckle through the use of fasteners, bonds, welds, etc. or preferably through a mechanical catch. Such a catch may comprise one or a multiple of pieces of material that extend from the surface of the band or buckle and interfere when assembled with one or more mating surfaces of the other element such that the band and buckle do not pull apart from each other under tension without intervention. Such mating can resemble the action of a common belt buckle, in which the extension passes into and possibly through a hole or gap in the material of the other object and is oriented such that tension of the system maintains the relative position of the extension and gap.

Alternatively, the mating can be maintained by spring forces resulting from deflection of one or both the objects. Such arrangements can mate similarly to common cable ties. Alternatively Velcro-like mates between the objects are possible. Any combination of the above mating features can be used to satisfy the intent of a strong, tension, and rotation-resistant joint between the band and buckle that can be assembled and possibly disassembled quickly and accurately in the field.

While bonding films in a flat stack is practical, scalable, and compatible with simple automation and standard mass manufacturing processes, this method of assembly relies on comparatively weak peel bonds between films to resist the internal balloon pressure. Mechanical roughening, metallization stripping, corona treatment, priming, e.g., with polyethyleneimine (PEI) based primers, reactive polyurethane bonding, or heat sealing with amorphous polyester (APET), EVA, polyethylene or native material can improve bond strength. The strongest peel bonds between relevant films are generally in the range of 10 lbs force per inch and 1 lb force per inch or less is common. The harness can be designed to bridge this peel bond and provide for reinforcement, e.g., through a lap adhesive bond between the balloon film and harness. Even a modest lap bond can exceed the tear strength of the films.

Receiver Accommodation

The balloon in accordance with embodiments of the present invention, alone or in combination with a separate harness, concentrates light and provides for pointing and mounting. The balloon also allows the installation or incorporation of an article to collect or relay or convert the concentrated light, herein called the "receiver." A "receiver" may comprise one or more secondary mirrors, fiber-optic bundles, light pipes, or array of light pipes, solar energy absorbers, photovoltaic cells or modules, photochemical or photothermochemical processing apparatus, and hybrids of these as well as other devices that relay, convert, or utilize solar electromagnetic radiation well known in the art. As used herein, the receiver assembly includes the receiver and its associated support and ancillary apparatus internal to the balloon, e.g., struts, mounts, electrical wires and conduits, coolant hoses, etc. While the structure of the receiver assembly itself is outside the scope of the instant invention, receiver installation, mounting, and operating requirements generally influence details of the balloon and harness designs.

As used herein, "incorporation" of the receiver assembly means that the receiver assembly is substantially assembled into the balloon during manufacturing. As used herein "installation" of the receiver assembly means at least part of the receiver assembly is placed into the balloon in an assembly step that can generally be performed in the field. Installation of the receiver assembly can be performed while films are uninflated, partially inflated, or fully inflated. Systems having an incorporated receiver assembly may be simpler to design, assemble, and install, but must either employ an inexpensive receiver or a factory-recyclable receiver in order to be economical. Moreover, an incorporated receiver may be difficult to service in the field. Systems having an installed receiver assembly may be more difficult to design and assemble, but have the advantage of simpler field servicing and film replacement.

Feedthroughs

Because the balloon has an internal focus and will generally need to be inflated in the field, balloon designs generally require ports between or through the balloon films through which gas, hardware, and interconnections can pass. Such a port, including a slot, slit, hole of various shape or non-sealed or bonded film interface is herein called a feedthrough. Feedthroughs can be incorporated into the balloon during manufacturing or installed in the field while uninflated, partly inflated or fully inflated. Field installations of feedthroughs could include tearing a pre-perforated slit or patch of film material, cutting or slitting using a sharp knife, or melting a slit or patch of film using localized heat.

A feedthrough introduces a stress concentration to the film that must generally be compensated, either by techniques well known in the art, e.g., using a thicker film than elsewhere necessary; by locally thickening the film, e.g., by lamination; by applying a patch or other reinforcement such as the harness, e.g., using an adhesive; etc. During operation, feedthroughs should not leak air excessively.

A variety of feed-through seal designs are well known in the art, including gaskets, bladders, adhesive seals, and grommets. If the receiver assembly is designed to be installed and removed while the balloon is inflated, there may be elements such as "trap-doors" and "septa" and the like that provide an adequate seal to support or maintain inflation while the receiver assembly is not fully installed. The feed-through and associated stress compensation and leak-limiting or prevention material are herein called a feed-through assembly.

Feedthrough assemblies can be positioned and oriented anywhere in the balloon assembly, provided their stress concentration compensation is appropriate, but some locations and orientations are favorable and unfavorable because of the desire to maintain optical efficiency and because of the non-uniform stress distribution in the inflated films. A feedthrough assembly on the reflective film, particularly inside the collection area, is unfavorable because it has a high likelihood of distorting the film and affecting optical performance. Feedthrough assemblies in the collection area of the clear film can reduce the collection efficiency by blocking or scattering light.

The state of stress in the balloon varies with position, inflation pressure, and loading. The poles of the inflated balloon are the two points at which the axis of rotational symmetry intersects the balloon films. The balloon equator is the widest circumferential circle on the balloon surface. A meridian is the intersection of a plane passing through the axis of rotational symmetry of the balloon and the surface of the balloon. At the poles, the films are in a state of biaxial uniform stress and have the maximum strain. Moving outward along a meridian from the poles, the meridianal principal stress and the tensile stress component increase and the circumferential tensile stress component decreases. The balloon film buckles or wrinkles starting near the circumference at which the circumferential stress component becomes slightly compressive and ending at the balloon's equator. In this wrinkled region the film experiences a weak compressive circumferential stress and a concentrated meridianal tensile stress. At higher internal pressure, the boundary of the wrinkled region is closer to the equator than at low pressure, because of circumferential and meridianal film strain. Since the collection cross-section at best approximately complements the wrinkled zone cross-section, balloons assembled from substantially elastically and or plastically deformed flat films can be more efficient optical collectors at higher pressure. Moreover, at high internal pressure, the concentrator performance is least affected by wind loading. Thus, except in winds high enough to distort the balloon and threaten the film material, the majority of the film stress will generally be produced by the internal inflation pressure.

Because of their uniform biaxial stress, the polar regions of balloons are most suitable for substantially circular feedthrough assemblies. An elongated feedthrough assembly whose long axis is aligned with a meridian produces the minimum stress concentration in a balloon that has rotational symmetry. Inside the wrinkle zone of the balloon, a slit-shaped port that is aligned with a meridian does not concentrate the inflation stress. Thus, that location and orientation is optimal for an elongated feed-through. If one is used, the harness is another optimum location for feedthroughs since the relatively stiff harness can relieve films of stress concentrations via adhesive lap bonds and the like. Similarly, an incorporated batten may be a suitable feedthrough for relatively small articles.

Feedthroughs can be employed to facilitate connections between the receiver assembly and harness or other external hardware. Such connections may include mechanical support, electrical connections, control and monitoring connections, coolant conduits, and inflation-gas conduits.

Feedthroughs can be employed for bracing the balloon harness following installation of the balloon. An example of a brace is a cable, rod, or beam that passes through a diameter or chord of the balloon to prevent substantial loads and moments from flexure, warping, and flutter of the mounting apparatus from being passed to the balloon films and harness.

Feedthroughs can be employed for passively maintaining the internal balloon pressure. Where inflation is maintained actively in operation, such a combination inflation port and check valve would be useful, for example, during installation to facilitate rapid inflation or to inflate the balloon prior to installation of other feedthroughs.

Passive pressure or film-strain regulators could also be employed as feedthroughs. The meridianal progression of the circumferential tensile stress and its associated strain provides a convenient physical mechanism for passively actuating such a strain regulator: when the balloon has strained such that the film at a particular location has a circumferential tension, a slit opens that spills excess inflation gas. One or multiple slits could be disposed about a balloon circumference, possibly in combination with an additional film or films to prevent excessive inflation gas leakage below the strain threshold. Strain regulation may have considerable advantages over pressure regulation, since the optical properties depend directly on the film strain. While related to the pressure, the film strain generally also depends on the temperature, humidity, inflation history (creep), and accumulated damage of the film, among other things. The relationship between pressure and strain also depends on batch-to-batch variables such as film thickness and density as well as the degree of biaxiality, annealing, crosslinking, and crystallinity.

Film Attachments

As used herein, a film attachment is any material assembly or material that is connected to the balloon film through bonds, welds, adhesives, friction, or mechanical fasteners for at least one functional purpose. Examples of film attachments include the harness, battens, trap-doors and septa for sealing feedthroughs, check-valve assemblies, cable and pipe supports, receiver assembly items, flutter-control and heat-exchange items and supports, and external mounting tabs.

Film Modifiers

As used herein, a film modifier is any material assembly, material, or chemical disposed, deposited, diffused, intercalated, mechanically intertwined, bonded, or laminated on a balloon film or a mechanical or chemical treatment of a balloon film for the purpose of changing the physical, mechanical, elastic, chemical, optical, or electrical film properties, reinforcing the film, or relieving stress concentrations within the film or at discontinuities such as feedthroughs, bonds, welds, joints, cracks, holes, tears, etc. Modifiers include adhesive tapes, patches, bonded films, sheet metal, fibers, adhesives, thermoplastic adhesives, thermosetting adhesives, contact adhesives, pressure-sensitive adhesives, B-stage adhesives, primers such as polyethyleneimine-based compounds, inks, dyes, vapor and water barriers, ultraviolet absorbers, ultraviolet protectants, infrared absorbers and reflectors, anti-reflection coating, slip coatings, plasma, flame, or corona treatments, self-healing and anti-scratch coatings and the like. Modifiers also include mechanical perforations and means to promote gas permeation. Modifiers can be incorporated during manufacturing or installed in the field. Laminated stress reinforcement patches surrounding feedthroughs are examples of incorporated modifiers; adhesive tape patches applied over holes and tears in the field are examples of installed modifiers. Film modifiers like slip coatings and plasma or corona treatments are well known in the art for facilitating manufacturing and adhesion.

A preferred film modifier is a patch used to bond, adhere, cohere, or otherwise retain the balloon to the harness. One such patch is a pressure-sensitive, contact, or other adhesive or adhesive-tape patch patterned on the outer balloon surface to facilitate installation and to distribute loads between the film and harness. One embodiment of this adhesive patch is a circumferential ring or rings disposed on the film such that, when partially or fully inflated, the ring adheres to the harness. Such a ring or rings disposed on opposite sides or spanning the bonded seam of the balloon are favorable because they can form lap joints with the harness that relieve the stress on the peel-bond between the films in addition to distributing wind and other loads. Further, it is preferred that a weakly adhering non-adhesive flexible strip covers the adhesive patches such that the balloon films do not adhere to each other or to the harness until the strip is peeled off the adhesive. Such strips facilitate shipping and handling and especially installation by allowing the balloon to be partly or fully inflated and carefully positioned in the harness before the adhesive is uncovered by gently pulling the strips out from between the harness and balloon. It is preferred that the adhesive, balloon film, and harness surface be formulated such that the adhesive remains substantially on the balloon film rather than the surface of the harness so, after deflation, balloon can be peeled intact from the harness without leaving a sticky residue on the harness. Such a sticky residue may interfere with installation of other balloon films.

Alternatively, the balloon can be partly or fully inflated and positioned into the harness and an adhesive tape installed to overlap one or preferably more seams between the harness and balloon film. This arrangement is less sensitive to transfer of adhesive residue to the harness because the residue will not excessively interfere with installation of the next balloon film.

Alternatively instead of tape, a glue, adhesive, solvent, or other bonding agent can be applied along a seam or seams between the balloon and harness. Such an adhesive should preferably dry or harden to a thin, substantially tack-free surface and should not produce hard or sharp edges that could nick, tear, or otherwise weaken the balloon films.

Another preferred embodiment of a modifier is a patch that holds the balloon film to the harness to support the balloon films and facilitate alignment during installation, e.g., before inflation or while the film is partly inflated. As with the patch used to hold the balloon to the harness in operation, a range of adhesive, tapes, glues, etc. may be employed, but careful consideration must be given to the composition, amount, and location of residues from this patch.

Film Distortions

As used herein, a film distortion is a mechanical stretching of a film. This distortion can be a plastic or elastic deformation or any combination. It can be biaxial or uniaxial and it can persist in the films following manufacturing or be employed prinicipally during manufacturing.

One distortion is the biaxial or, more generally, anisotropic tensioning of a film to compensate for or reduce uniaxiality or surface unevenness (e.g., dimpling) in the film. Such compensation can be used to ensure the film assemblies inflate to precise shapes. Stretching films in this manner can be used in combination with other techniques to reduce the effect of film uniaxiality on inflated film shape, such as orienting top and bottom films differently, e.g., substantially orthogonally. This stretching can be performed alone or in combination with heating either to momentarily ensure alignment during an operation on a film or to permanently distort the film. For example, one or both films can be stretched while bonding to each other or to a batten or means of holding a batten such that the inflated shape is closer to ideal that without the stretch.

Another distortion is an out of plane bowing or embossing of the film. As described earlier, such distortions can be produced a variety of ways including applying pressure differences across films, mechanical pressing and embossing, alone or in combination with heat. A purpose of these out of plane distortions can be to adjust the depth of the balloon, e.g., to better accommodate a receiver, or to modify inflated film optics. One such distortion is a bow of a substantially circular region that is roughly concentric with the axis of the balloon. Another distortion is a bow of a region between two substantially concentric circles roughly aligned with the balloon axis.

Another distortion is embossed "wrinkles" in a film surface that affect the inflated film shape. Embossing of such wrinkles offers the balloon designer considerable leeway in tailoring the optical performance without the need to deposit additional material (e.g., add film modifiers). Embossing can be performed quickly and repeatedly a number of ways well known in the art mechanically and in combination with heating. Unlike bowed films, these wrinkles can be small enough not to impact the ability to roll or stack films flat.

Embodiment 1

FIGS. 1A-B show views of an embodiment of an inflatable solar energy concentrator in accordance with the present invention. FIGS. 1A and 1B respectively show elevation and plan views of the substantially flat, uninflated films. The relative flatness and thinness of the uninflated films facilitates manufacturing and distribution. FIGS. 1C and 1D respectively show elevation and plan views of the inflated films. These views are based on actual measurements and accurately depict the film shape and extent of wrinkling. FIG. 1E shows where rays propagating downward parallel to the axis of the balloon (not shown) reflect after hitting the reflective film. The rays concentrate along the balloon axis, with a peak concentration near the center of the balloon. The rays diverge quickly on leaving the balloon and thus pose no external fire hazard.

Figure 2:
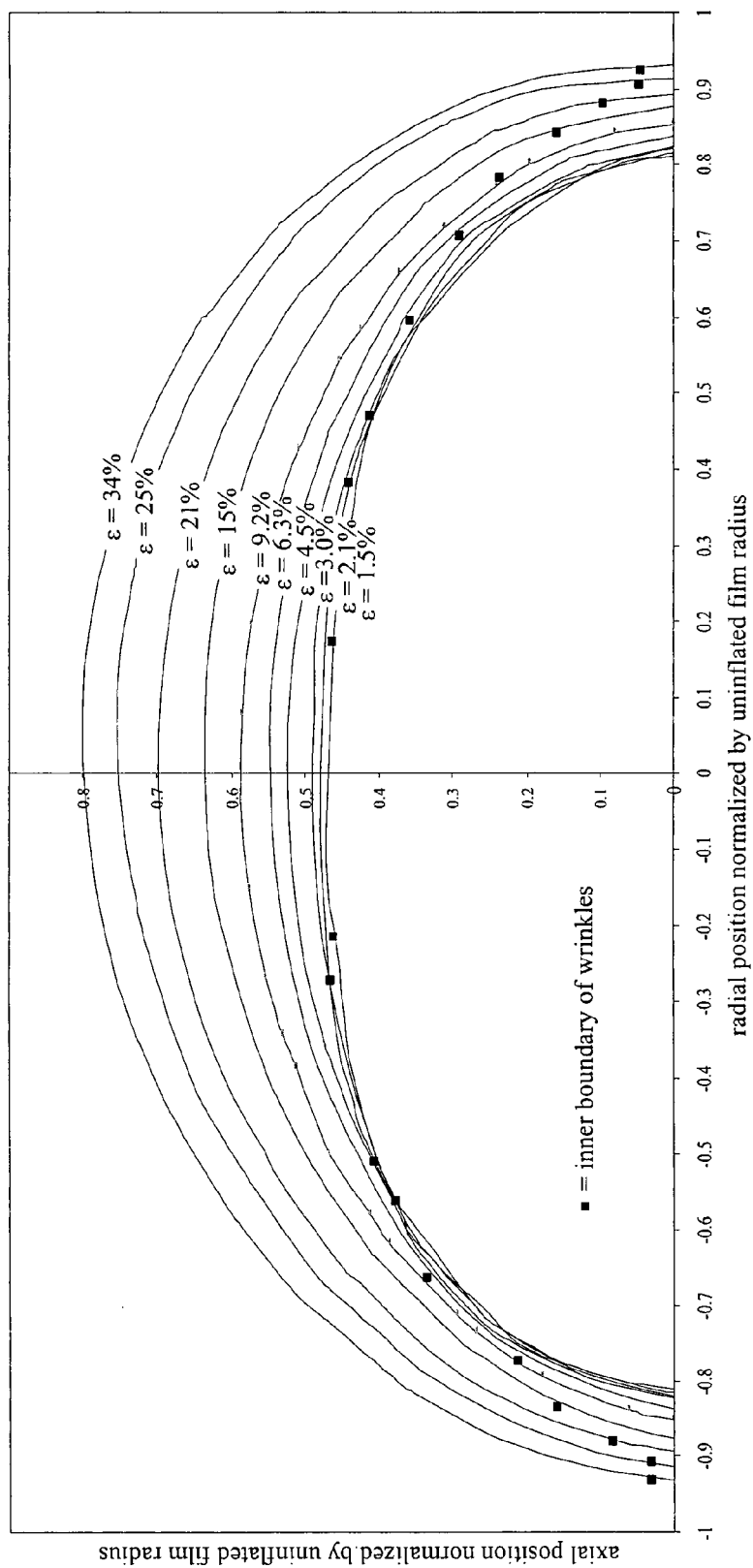
FIG. 2 plots measured balloon profile versus average radial strain ($\epsilon$).

The profile and boundary of the wrinkle zone depends on the balloon strain. FIG. 2 shows measured profiles of the balloon cross-section for various amounts of average strain. As the amount of strain increases (e.g., at higher internal pressures), the wrinkled zone advances toward the balloon seam (axial position=0). The inflated balloon has a diameter between ~80 and ~93% of the uninflated balloon diameter. The radial strain peaks at the axis of the balloon and gradually lowers toward the edge of the balloon. The circumferential strain is maximal near the axis of the balloon and drops rapidly with distance from the axis.

The location and distribution of rays reflected from the balloon film varies with the radial film strain. FIGS. 3A-B show how paraxial rays reflect off various concave surfaces. Specifically, FIGS. 3A-B respectively show a paraboloidal and spherical surface. FIGS. 3B-L show ray traces from measured balloon profiles for different amounts of strain or pressurization of the same balloon. The balloon in FIG. 3C is lightly inflated at practically zero strain. The film strain increases from ~1% in FIG. 3D to a peak of ~45% in FIG. 3L, near the burst strain of the nylon film of the balloon. In all cases, the region of maximum ray concentration lies within the balloon. The focusing aberration of the reflective surface is clearly much worse than that of a spherical surface.

The size and shape of the receiver should be co optimized with the balloon diameter and inflation strain for best performance. For example, a cylindrical receiver situated along the axis will receive all light incident on the reflective surface except for rays that are deflected off a radial trajectory by a non-circular balloon shape or wrinkles. A variety of other shapes can be employed for efficient receivers, e.g., spheres, hemispheres, or pyramids, oblate or prolate spheres or hemispheres, or specifically matched geometries, etc. However, a common receiver has an active area that is a flat disc or square.

In spite of the aberrations, high concentration factors can be obtained with such receivers for light that falls on the central portion of the balloon. FIG. 4A shows the concentration factor at various positions in a balloon inflated to a strain of ~1.5%. FIG. 4B shows the percentage of the plan-view area of the balloon whose rays fall within the concentrated region. Clearly the aberrations introduce a serious tradeoff between the concentration factor and collection efficiency of the balloon, measured as a function of the inflated balloon diameter.

Figure 5:
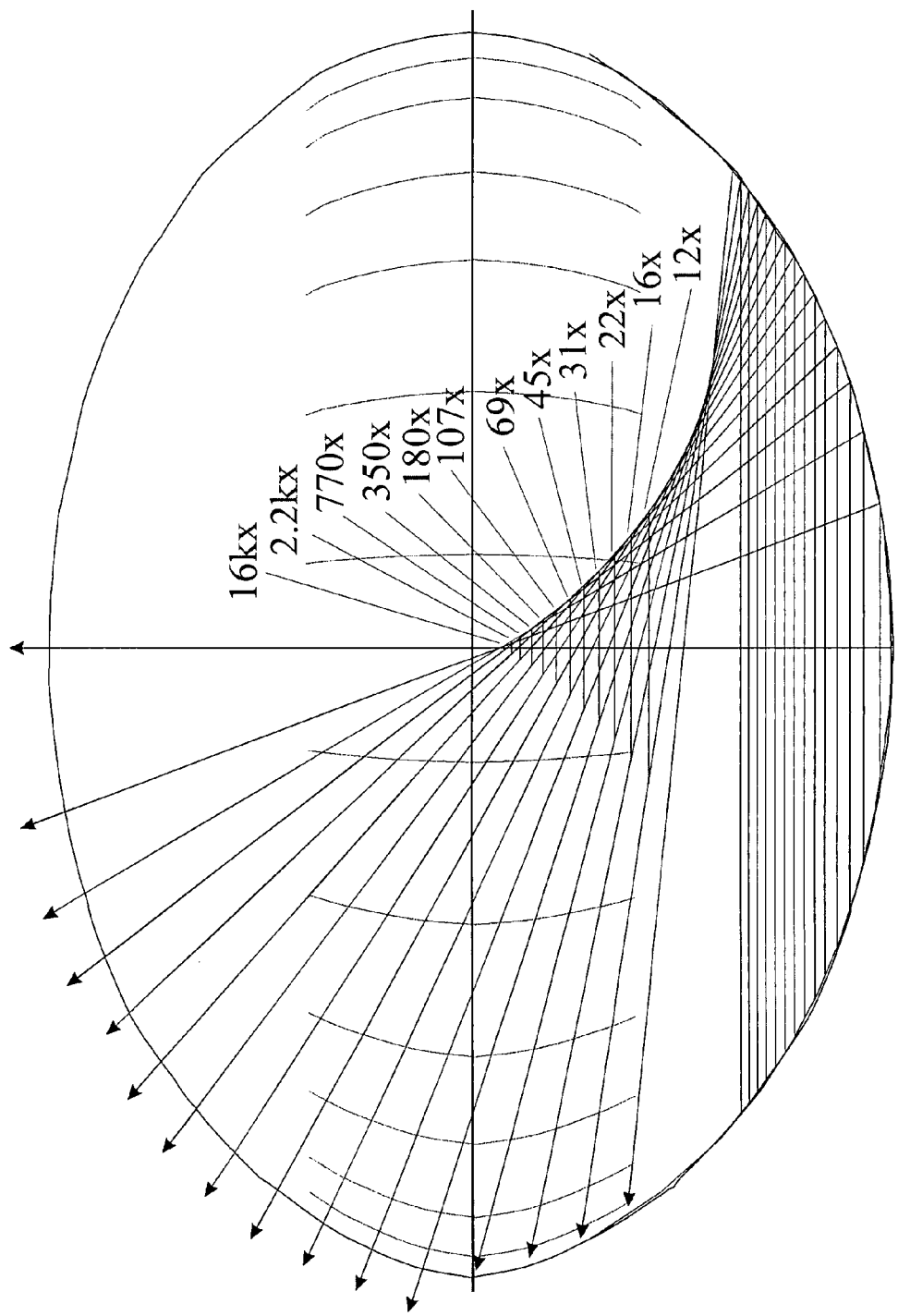
FIG. 5 shows the flat-receiver concentration factor and collection efficiency of a balloon inflated to a strain of 9.2%.

The tradeoff between concentration ratio and collection efficiency improves with balloon strain, at least up to about 5 to 20% strain. FIG. 5 shows the performance of a balloon at 9.2% strain. A receiver that uses 200× concentration would receive light from approximately 30% of the balloon in FIG. 5.

A large fraction of waste light may not pose a serious disadvantage for embodiments in accordance with the present invention, for several reasons. First, the inflated balloon can be >400× less expensive on a plan-view area basis than conventional rigid mirrors. The "real estate" or land-use cost of solar collectors is similarly small compared to the cost of the receiver apparatus. The primary costs of this inefficiency for a given generating capacity may include:
1. increased wind loading and support system requirements;
2. increased film material and harness material costs;
3. increased real estate requirements; and
4. lower power generation capacity per concentrator (increased labor and tracking system cost per Watt).

There are some advantages of this inefficiency that offset these costs. For example the wasted rays of light soften the edge of the concentrated beam, providing for lower pointing stability and accuracy requirements.

FIGS. 6A-B show the effect of a 5% slope pointing error on the rays. The horizontal bar below the dashed seam-line depicts a receiver. FIG. 6A shows a balloon that has a 5% pointing slope error. Such errors could arise from, e.g., wind flutter or mechanical flexing. Some of the normally 'wasted' rays are incident on the receiver, reducing the degradation in performance of such pointing errors. In the embodiment of FIG. 6A, rays that are normally wasted become incident on the receiver, boosting performance when solar tracking is sub-optimal The inflatable balloon design can facilitate real-time control and optimization of the shape of the concentration zone. For example, FIG. 6B shows the same balloon, pointing error, and receiver as FIG. 6A at lower inflation pressure. In such conditions, the operator may choose to reduce the inflation pressure to increase the time-averaged generation performance. An operator may reduce the inflation pressure to obtain the profile shown in FIG. 6B when pointing stability is poor, e.g., in high winds. The softness of the concentration profile and the ability to tune the concentration profile to environmental conditions should facilitate far less accurate and rigid balloon pointing apparatus, with significant system cost savings.

One Embodiment of a Battened Balloon

Film attachments can be used to improve the concentration factor and collection efficiency at the expense of additional manufacturing complexity, material requirements, or installation requirements. The most important class of these attachments for improving the balloon figure is called a "batten." As used herein, a "batten" is a film attachment that resists buckling and wrinkling under compressive stress. A batten can be incorporated onto the film, e.g., by heat or adhesive bonding during manufacturing, a pocket or sleeve can be incorporated on the film to accommodate a batten that is installed in the field (and possibly re-used), or a batten can be simply installed adhesively onto a film in the field. The batten can be located on either the inside or outside of the reflective film. A preferred embodiment of a batten is a strip, extrusion, or rod that is installed into a ring-like pocket in the reflective side of the balloon. This embodiment is preferred because the batten can be reused. An alternate embodiment is a batten having a cross-section that is engineered for minimal material use and bonded to the films during manufacturing or a batten that can be removed from the film and reused by the manufacturer or a recycled.

FIGS. 7A-E show various views of an embodiment of an inflatable concentrator having a circular batten on the reflective film. FIGS. 7A-B, respectively, show the uninflated films and batten in elevation and plan view. FIGS. 7C-D respectively, show the inflated films and batten in elevation and plan views. The dashed line shows the shape of the reflective film in the absence of the batten. FIG. 7E overlays a ray trace from the battened reflector on the inflated balloon.

There is little or no advantage conferred by placing a batten on the clear film unless it is desired to move the focus outside the balloon, or unless the batten on the front film is contributing to the function of a balloon harness. The dashed curve in FIG. 7C shows the steep profile of the reflector in the absence of the batten. With the batten, the actual film shape within the batten is approximately spherical. As FIGS. 7C and D show, wrinkles do not propagate substantially radially inward from the batten. The concentration factor of the design in FIG. 7E is ~870× over 73% of the balloon area. If the uninflated diameter is the same, the inflation pressure of the design in FIGS. 7A-E is similar to that in FIG. 3G, which exhibits much lower efficiency.

The batten dramatically improves the concentration factor and collection efficiency that can be simultaneously achieved. However, costs of using a batten include:
1. additional assembly and installation and stress-concentration;
2. additional material/concentrator;
3. additional stress concentration; and
4. tighter pointing requirements.

Battened balloons also concentrate light most near the clear film surface, which may reduce the clear film lifetime, add complexity in the design of the receiver assembly, and expose articles or personnel outside the balloon to highly concentrated sunlight.

Figure 8A:
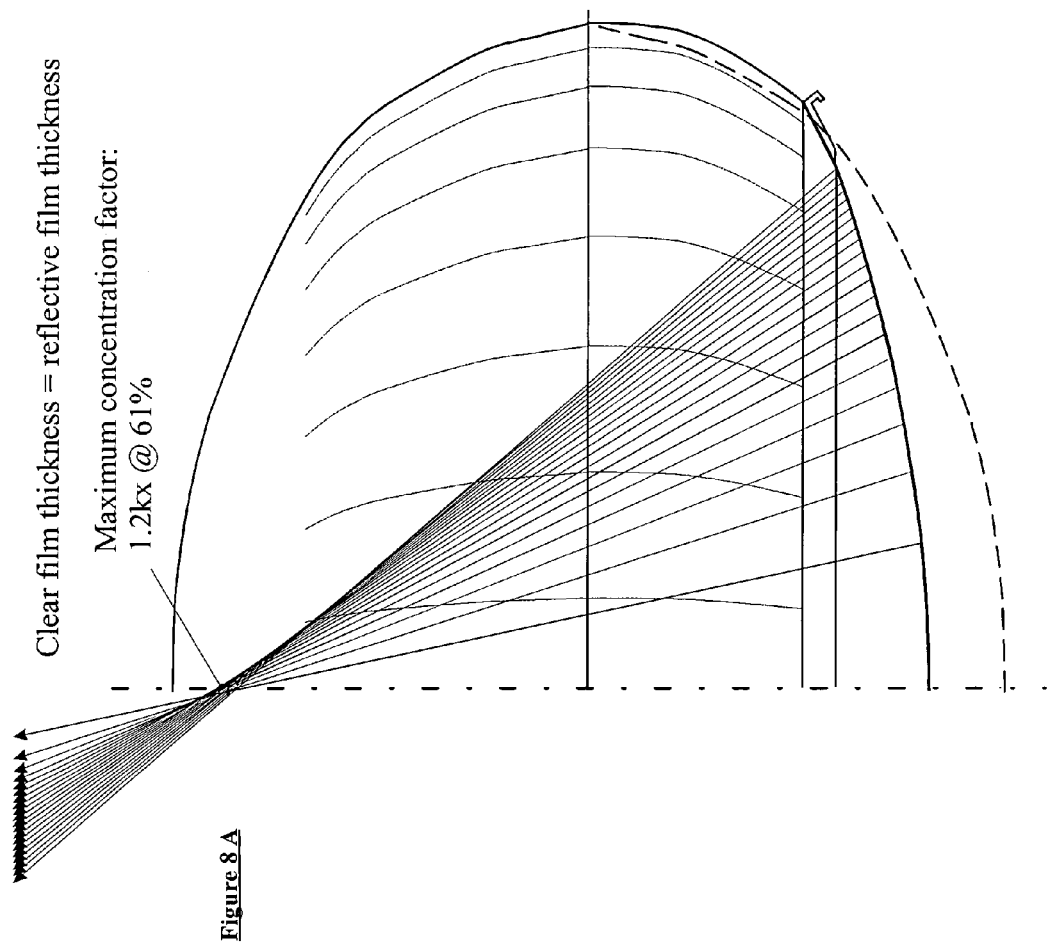
FIG. 8A shows a battened balloon that produces 1.2 k× concentration with a same stiffness of clear and reflective films.
Figure 8:
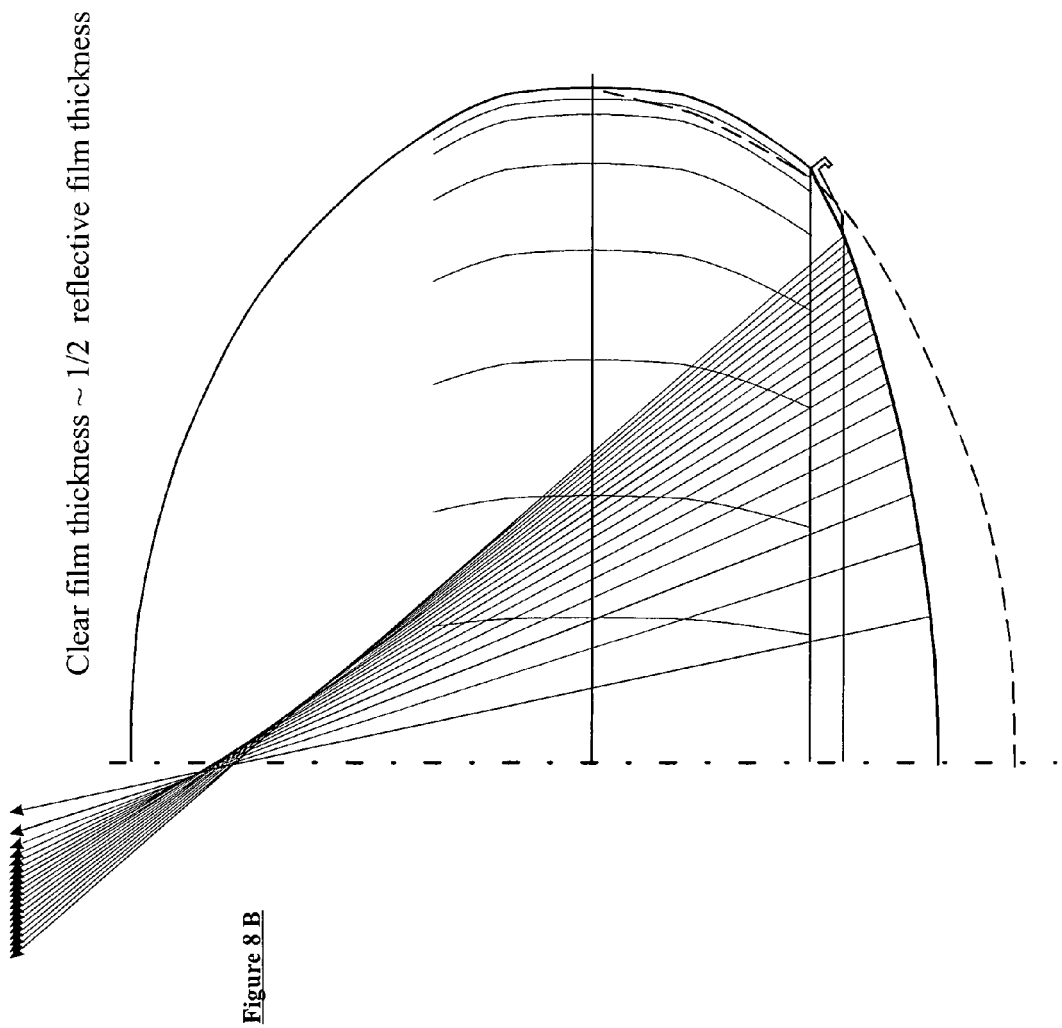
FIG. 8B shows a battened balloon that produces 1.2 k× concentration with a lower stiffness of the clear film.

FIG. 8 shows two designs that employ a batten to achieve a concentration factor of 1.2 k×. The embodiment of FIG. 8A uses the same stiffness films for the clear and reflective film. The embodiment of FIG. 8B uses a clear film that is about half the stiffness of the reflective film. Dissimilar film stiffness can be employed for battened and unbattened balloons alike for various engineering purposes.

In the case of the embodiment of FIG. 8B, the choice may be driven by the desire to move the front film away from the concentrated focus. Certain metallized films, e.g., mylar or PET can exhibit better reflective properties and stability than others, e.g., nylon or BOPA and are somewhat stiffer and support lower ultimate strains. Using dissimilar materials could place the reflective film under less strain while keeping the focus internal to the balloon. Finally, dissimilar stiffnesses arise naturally from the use of dissimilar films in the process of optimizing the strength of the balloon per material usage, cost, or lifetime.

The clear film material should be able to withstand ultraviolet light irradiation. For extended concentrator life, the clear film can either resist degradation of its optical and mechanical properties under such irradiation, or initially possess an excess capacity (e.g., load-bearing). Acrylic materials are reasonable clear-film materials, offering good lifespan at relatively high cost and poor strength and temperature performance. Ultra-violet stabilized or inhibited polyester films offer modest lifespans at good strength and temperature performance and moderate to high cost. Ultraviolet-stabilized polyamide has similar properties at slightly higher cost and lower stiffness. Polyvinylfluoride (PVF) and other fluoropolymer films (TEDLAR, TEFZEL, etc.) offer exceptional and possibly excessive lifetime at a high cost and low strength. Other films of note include polyethylene-based plastics, which are inexpensive, but suffer from poor optics and low strength, temperature, and lifetime performance, APET (amorphous polyester), polycarbonate, and polypropylene. Biaxial films may be used since this simplifies the design of apparatus to create films that inflate to a desired geometry.

It may also be desirable to use films that have a substantially linear, Hookian stress-strain relationship at low and moderate stresses. Moreover, film creep is undesirable as it necessitates lowering the inflation pressure over time or otherwise compensating for evolving concentrator behavior. Unplasticized or slightly plasticized polymers having a relatively high glass-transition temperature, particularly crystalline polymers that are nevertheless optically transparent are preferred for limiting creep.

One Embodiment of a Batten

Figure 11:
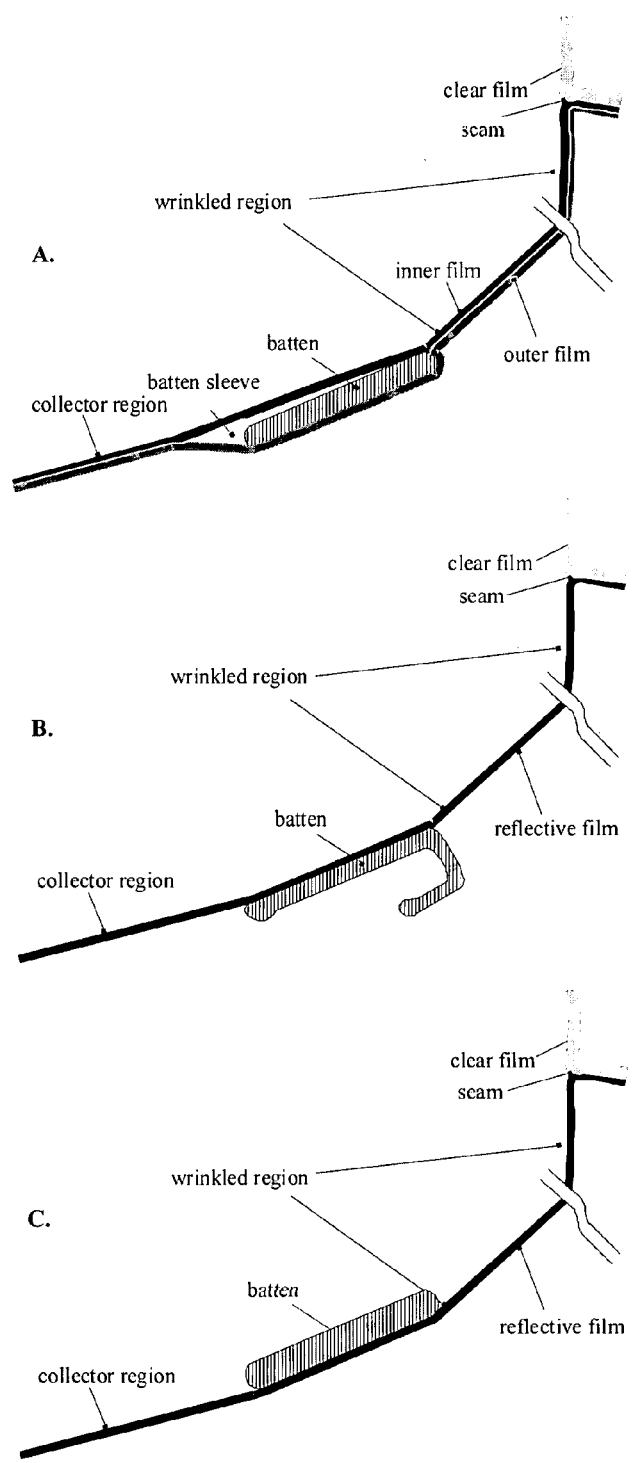
FIG. 11A shows attachment of a batten installed in a sleeve between laminated films.
FIG. 11B shows attachment of a batten incorporated externally.
FIG. 11C shows attachment of a batten incorporated internally.

An embodiment of the batten attachment is a plastic pocket that is made by laminating a film onto the reflective film at least along a circular rim with at least one opening for installing a batten in the field, as shown in FIG. 11A. In addition to providing a sleeve for the batten, this film laminate can provide extra strength and protection against water to the reflective film. The non-bonded area for the sleeve can be created by printing, or rolling, or otherwise applying a material that resists adhesion in the region of the sleeve or could be created by masking the adhesive, e.g., heat seal, material during coextrusion or by applying a sacrificial layer along the desired sleeve ring before coextrusion that can peel off without excessive stress, or by avoiding applying sufficient heat and pressure to the region. A disadvantage is that the outer side of the batten has a peel bond that is under relatively high tension.

Heat sealing is another preferred means of bonding film attachments, because of the strength and low cost of the bonds. Alternatively, solvent welding, rf welding, and ultrasonic welding can be employed as well as other bonding techniques well known in the art. For example, a preferred embodiment of the batten attachment is a circular hoop of a plastic, metal, or composite strip that is heat sealed or adhesively bonded (possibly using one or more of the approaches to improving bond strength listed earlier) along one edge to the reflective film, either on the outer or inner surface of the film, as depicted in FIGS. 11B and 11C, respectively.

An advantage of incorporating the batten on the outer surface is that the batten does not need to be installed before making the primary balloon seal. Moreover, the batten can more readily be engineered for low material use and to attach mechanically to the harness, since it does not need to slide into a stressed seam. The batten is held by peel bonds that are under a relatively small amount of tension.

Incorporating the batten inside the balloon as in the embodiment of FIG. 11C, removes the tension from the bond. However, the ability to engineer an ideal extrusion shape is tempered by the need to sandwich the batten between the uninflated films during assembly. A mechanical connection between an internal batten and the harness would typically require one or more film feedthroughs, but the relatively low-stress lap bond of the batten readily provides reinforcement.

One Embodiment of a Semi-Rigid Balloon

Embodiments of the present invention are not limited to completely flexible or battened balloons. In accordance with an alternative embodiment, a balloon can be formed from films that are thick enough to resist some bending or buckling, but not enough to resist the large stresses produced by wind loads without damage or excessive distortion. The inflation air can act as a key structural element to obviate other reinforcements, e.g., bracing and ribs. The inflation air also can tune the shape of the semirigid surfaces and consequently the optics of the balloon.

Because of the relative thickness of the material, inflation pressure alone will not generally distort such a film into a shape having enough curvature to achieve a focus internal to the balloon. Thus, a permanent film distortion will generally be required for such balloons.

This distortion can be applied by equipment in the factory or in the field. If the distortion is applied in an offsite factory, the films can be stacked in their bowed configuration for distribution. Alternatively, the film stock could be shipped to the field in a roll form and distorted in the field using a portable or fieldable machine to avoid the packing inefficiency and difficulty of transporting semi-rigid films in their distorted shape. Alternatively, the film stock could be distorted using structures that can be shipped substantially flat and "popped" into the proper shape in the field by inflation pressure, by hand, etc.

In such embodiments, the semi-rigidity of the film also provides the opportunity to fashion a faceted "Fresnel mirror" by relatively small ridges. Such a faceted mirror could improve the effective collection area of the mirror without building up large deviations from a naturally stable inflated film shape that can make the semi-rigid mirror susceptible to circumferential buckling under inflation stresses. Possible semi-rigid films include metal films, e.g., polished aluminum, plated or metalized plastics, laminates of metal films and protective barrier films, or coated films and the like.

Embodiments of the Harness Assembly

FIG. 9 shows the typical elements of a harness assembly, which may be fully or partly incorporated during manufacturing or substantially installed in the field. In this particular embodiment, the tether interface is repeated in substantially a mirror image on the opposite side. Three or more tether interfaces can alternatively be employed each having only one tether point. Elements of the harness assembly of FIG. 9 include at least one ring or arc around a circumference of the balloon and an interface with the balloon film. This interface is what holds the balloon to the ring and distributes loads over the balloon film. Embodiments of this interface include externally applied tape, adhesive, and pre-patterned adhesives, mechanical interlocking or intertwining features, friction, and the like. If the balloon seam is weaker than the films, it is preferred for the balloon interface to span or surround the seam for reinforcement. The harness may optionally include elements such as slots, tabs, eyelets, and the like to assist with film alignment and balloon installation.

An embodiment of a part of the ring is a thin sheet-metal, plastic, or composite strip which is flexed into shape in the field. Because balloon circumference can be large, for distribution purposes multiple strips may have provision to be installed to form the ring in the field. FIGS. 12A-C show various views of one such strip 1200. FIG. 12A shows a front view of the strip, FIG. 12B shows an edge view, and FIG. 12C shows a detailed front view.

As shown in FIG. 12C, element 1202 is a feature to facilitate mating with other elements of the harness assembly. The band can also be formed out of plane to accommodate or facilitate mating to other harness elements. Element 1204 is an example of a feature to facilitate initial alignment and placement of the concentrator films. Element 1206 is an example of an element to facilitate adjustment of the harness circumference. Element 1208 is an example of a mechanical reinforcement, e.g., a hem or laminated reinforcement to withstand stress concentrations.

Figure 15:
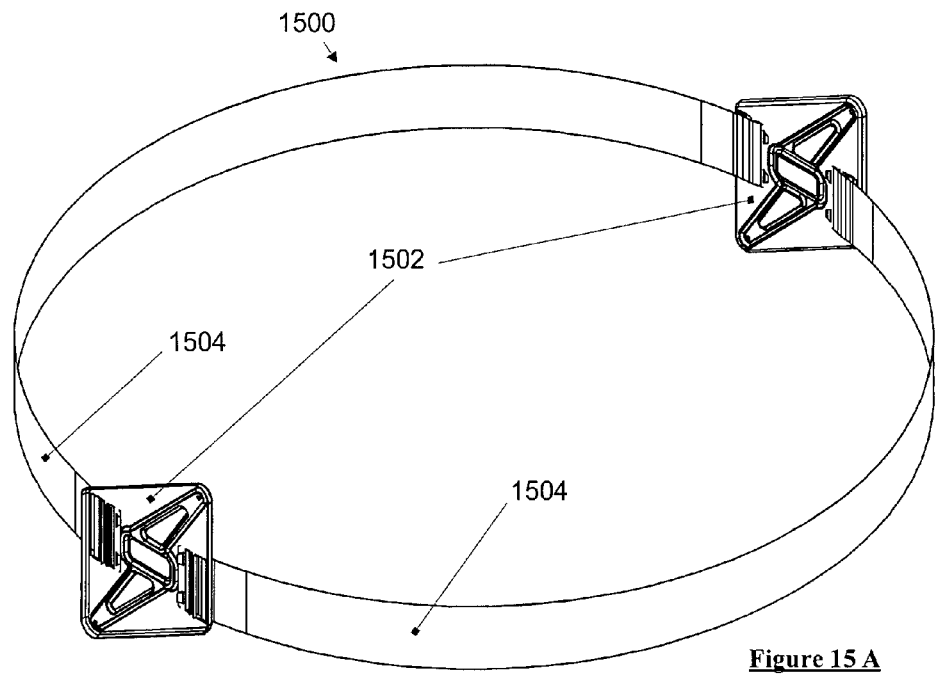
FIGS. 15A-B show perspective and enlarged views, respectively, of a concentrator assembly, remotely operated latch, and tether point in accordance with an embodiment of the present invention, together with additional elements including a receiver strut and coupler.
Figure 15:
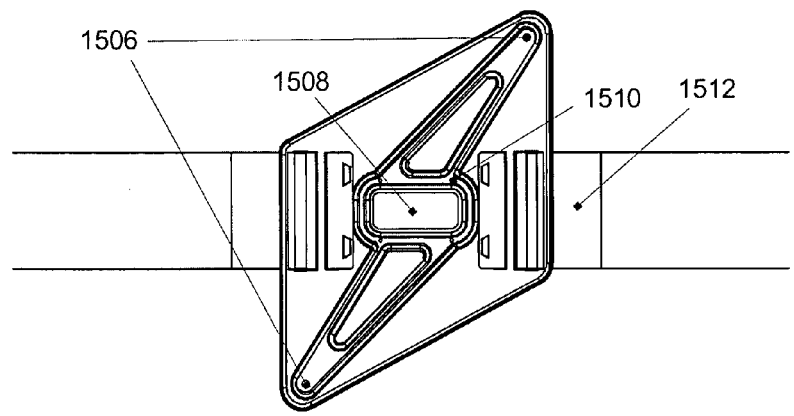

Elements 1302 and 1502 shown respectively in FIGS. 13 and 15 (described below), depict a sample embodiment of this strip in its flexed and installed state. Alternatively, the ring can be made from stock contained on a roll in an operation that may also include forming steps to generate a desired cross-section and hoop shape.

FIGS. 15A-B show embodiments of a harness assembly 1500 that employs a rigid mating part 1502 that incorporates pivots 1506 to interface to a tracking apparatus, and provision for a feedthrough 1508.

Figure 13A:
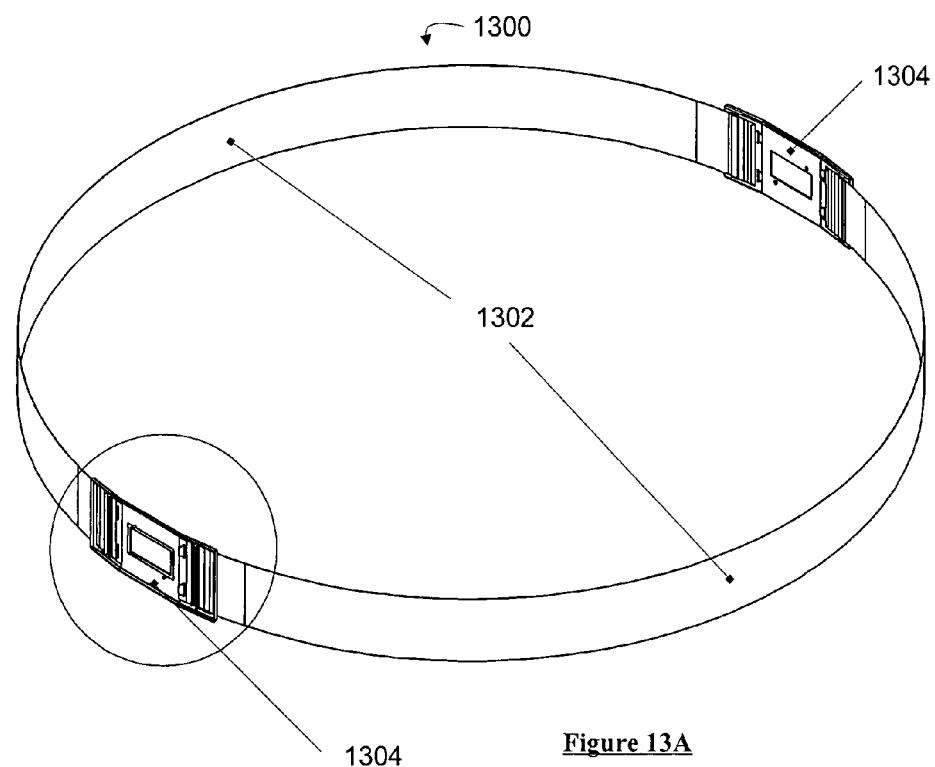
FIG. 13A shows a perspective view of a harness assembly utilizing a buckle in accordance with an embodiment of the present invention.
Figure 13B:
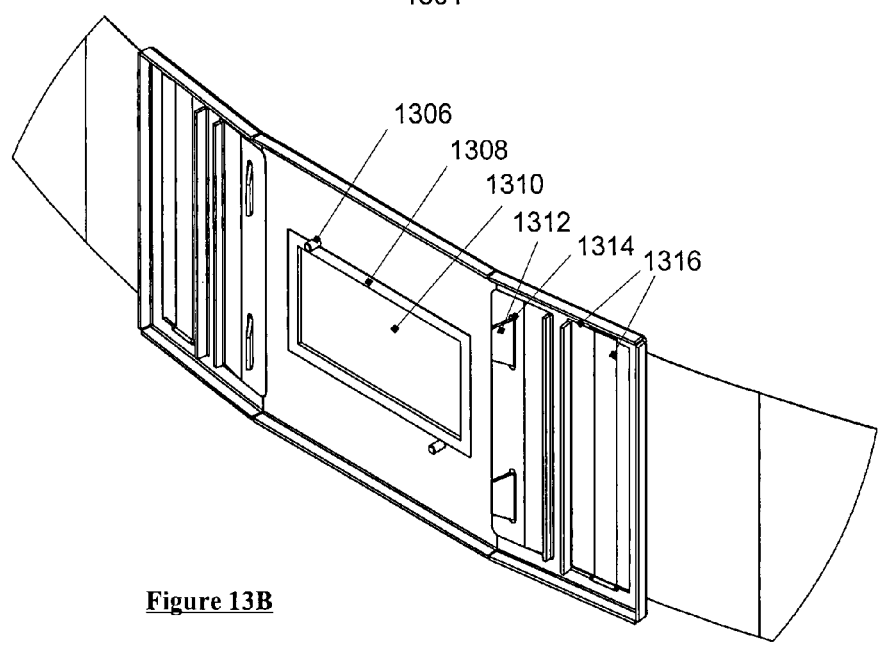
FIG. 13B shows an enlarged view of the buckle of FIG. 13A.

FIGS. 13A-B show an embodiment of a harness assembly 1300 that employs a rigid element 1304 herein called a "buckle" to hold the bands that form the ring 1302. This buckle provides a feedthrough port 1310 and positively constrains the bands. In this embodiment, rotation of the bands is inhibited by a system of close-fit guide slots 1316 and tabs 1312. When installed, the tabs pass into holes, slots, indentations, or other such shapes 1314 such that the bands are restrained against tension.

In this embodiment, both the angle of the tab and springiness of the band contribute to the security of the restraint. Also in this embodiment, the band is hemmed in some fashion, e.g., folding the material over onto itself or laminating a reinforcement plate near the end of the band to provide extra strength to these regions of stress concentration. The buckle itself does not itself contain pivots to tether the concentrator to a tracking assembly and therefore must mate to another part that provides this tether. The complexity of using a separate tether may be justified because it simplifies the design of a fast connect/disconnect system.

Figure 14:
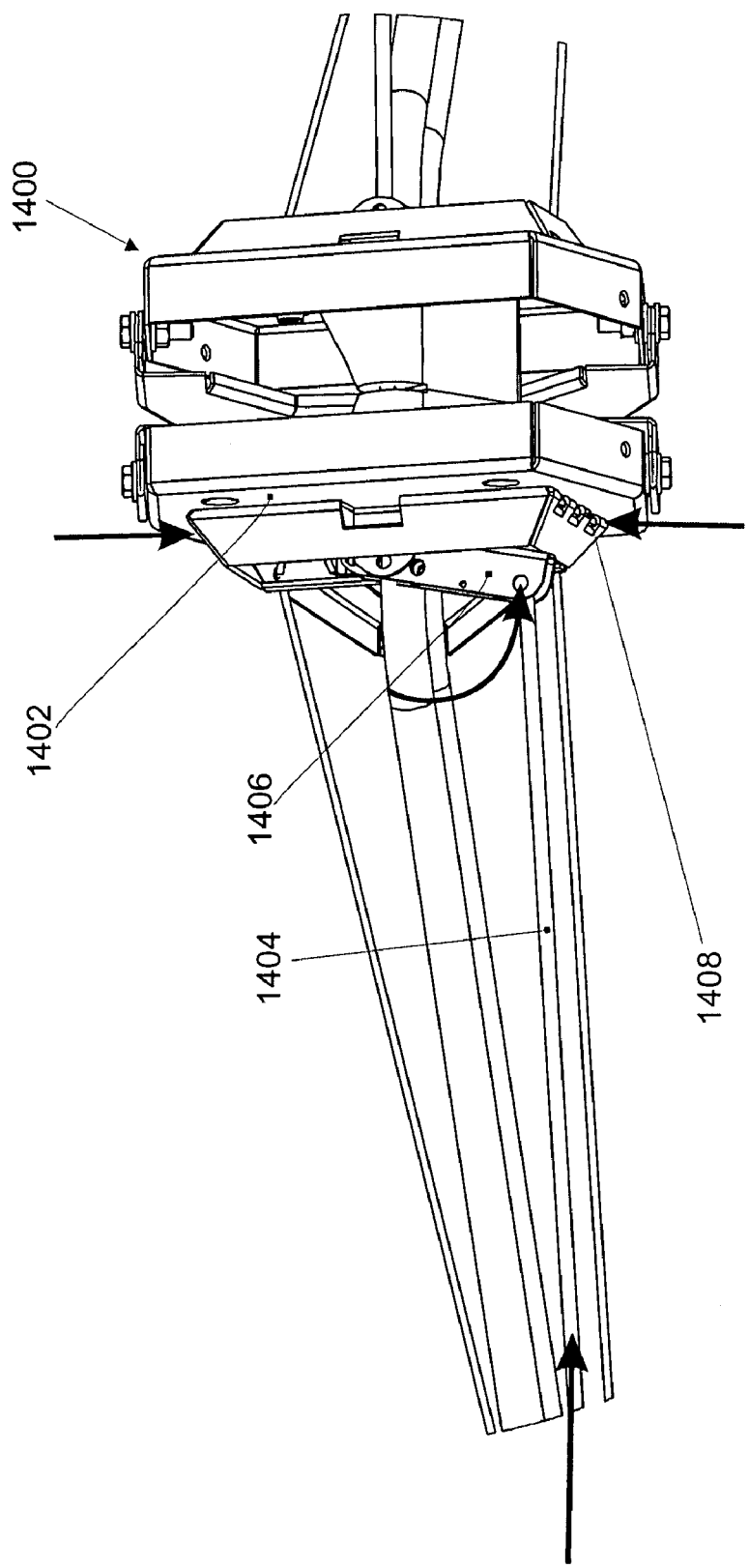
FIGS. 14A-C show perspective views of a method of assembling a buckle and a separate tether with a remotely actuated latching mechanism in accordance with an embodiment of the present invention.
Figure 14:
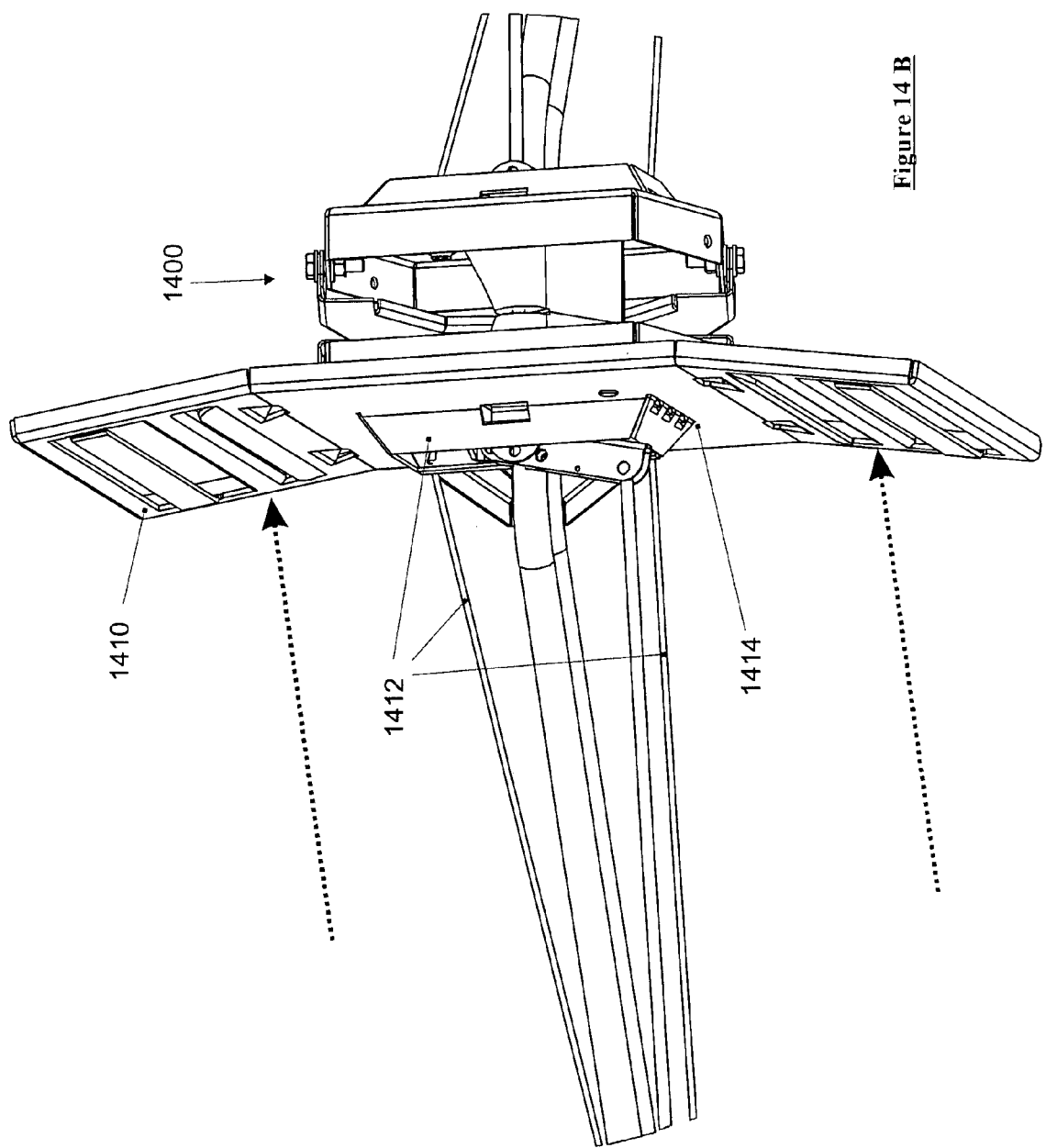
Figure 14:
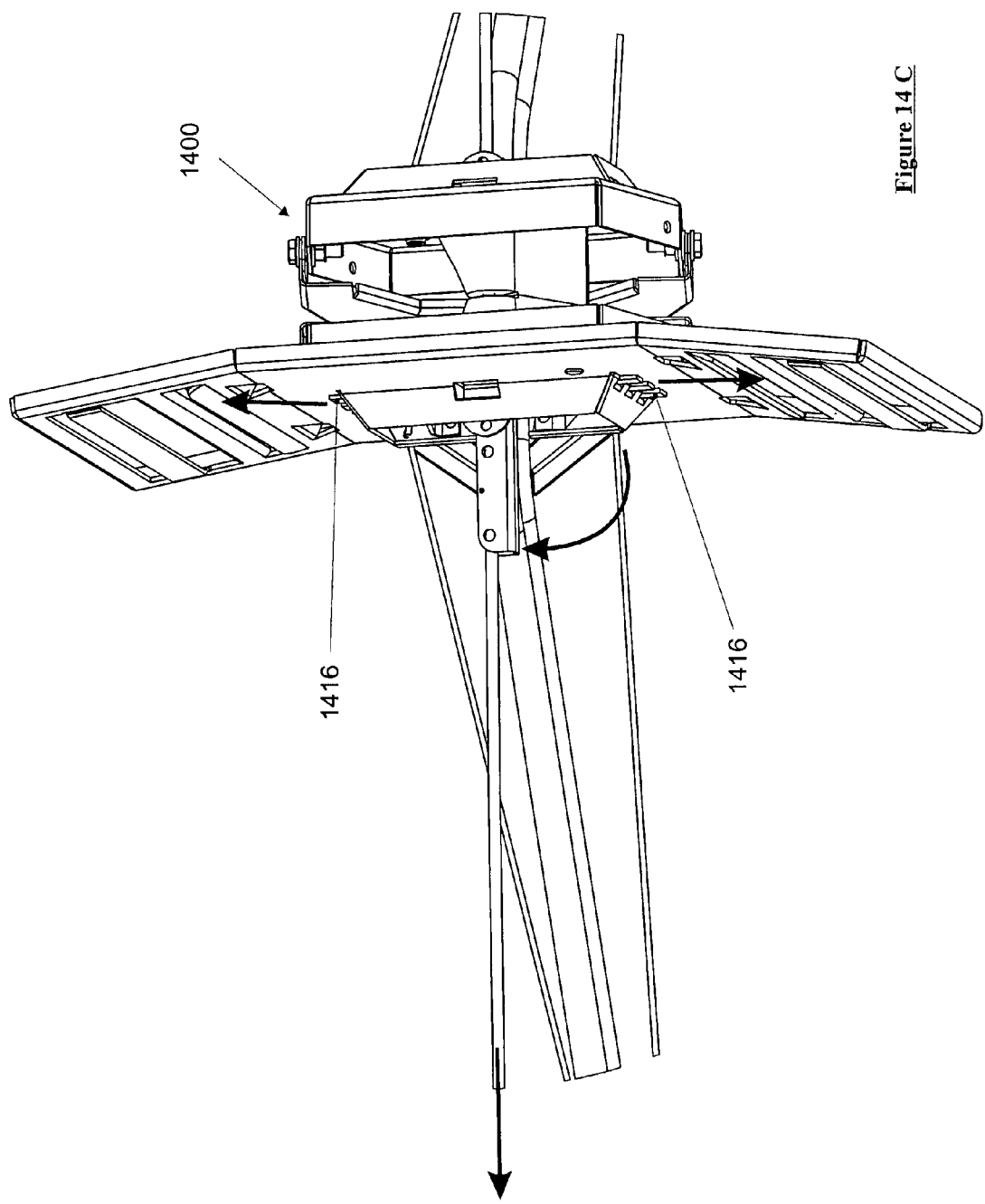

FIGS. 14A-C show views of an embodiment of such a connect/disconnect system 1400. Element 1402 is a combination tether, sealing plate, and latch assembly. Element 1404 is a cable, and element 1406 is a spring-loaded lever. In the sprung position, with element 1404 slack, the lever withdraws latching fingers into slots 1408. The concentrator assembly (depicted for clarity by only the buckle 1410) is then free to slide along guide surfaces 1412 of element 1402 and (in this embodiment, cables) of the strut that holds the receiver. When the concentrator is seated, the guides constrain the buckle such that its relative position and especially orientation is accurately maintained.

In this embodiment, the guide surfaces of element 1402 mate with a port 1414 of the buckle, but any suitable feature could be mated. Once in place, the cable 1404 is tensioned, rotating the lever and thereby engaging fingers of a latch 1416 which constrain and possibly preload element 1410 against element 1402, forming an air and water tight gasket seal.

Other embodiments of this connect/disconnect system involve a range of different reversible mating and latching approaches including other mechanical arrangements, magnetic, electromagnetic arrangements, solenoid-actuated latching and non-latching mechanisms etc. Whatever the approach, the ability to actuate the latch remotely mechanically, e.g., a cable, pole, or another specialized tool, electronically, via a switch, signal including a wireless signal, or software command is desirable for reducing the maintenance and replacement time for a concentrator, since this can allow an operator to install or remove balloons while accessing only one side of the assembly. The remotely controlled side may coincide with access hazards, e.g., high voltage, heat or hot water, elevation, etc. and that the remote control thus isolates a service technician from such hazards.

Figure 16:
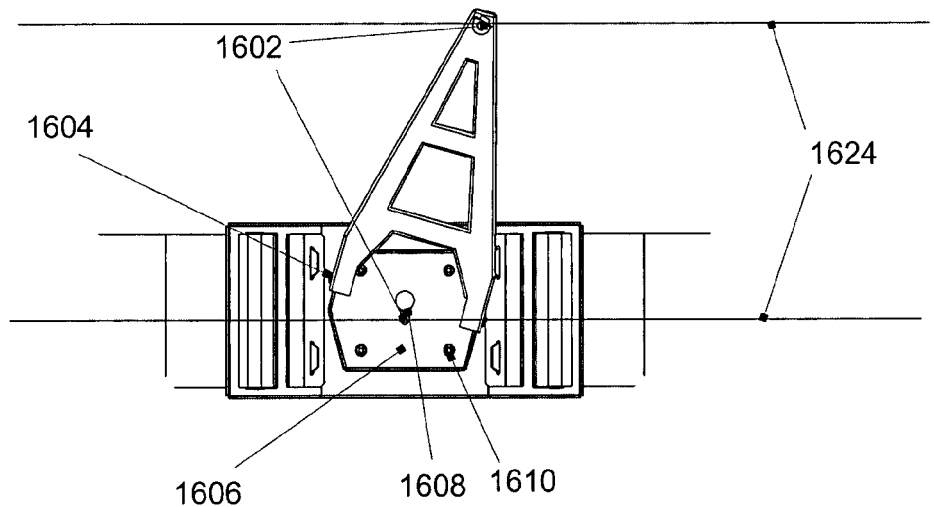
FIGS. 16A-C show views of a harness assembly utilizing a combined buckle and tether in accordance with an embodiment of the present invention.
Figure 16:
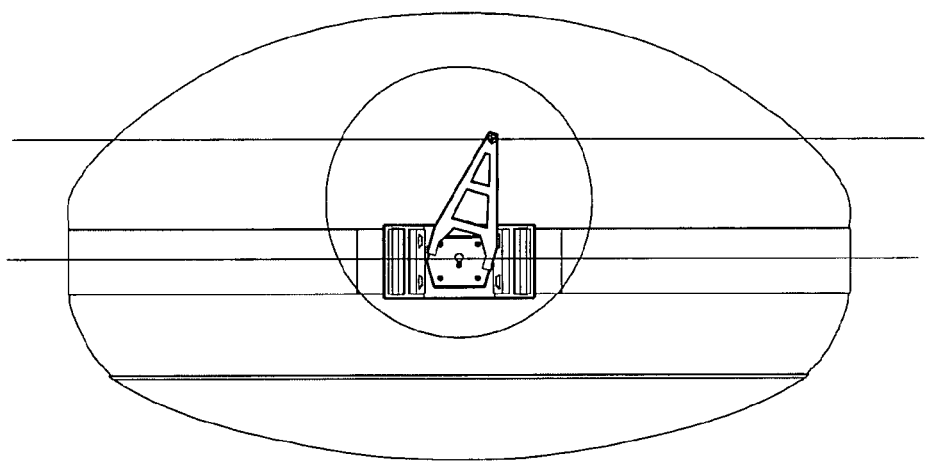
Figure 16:
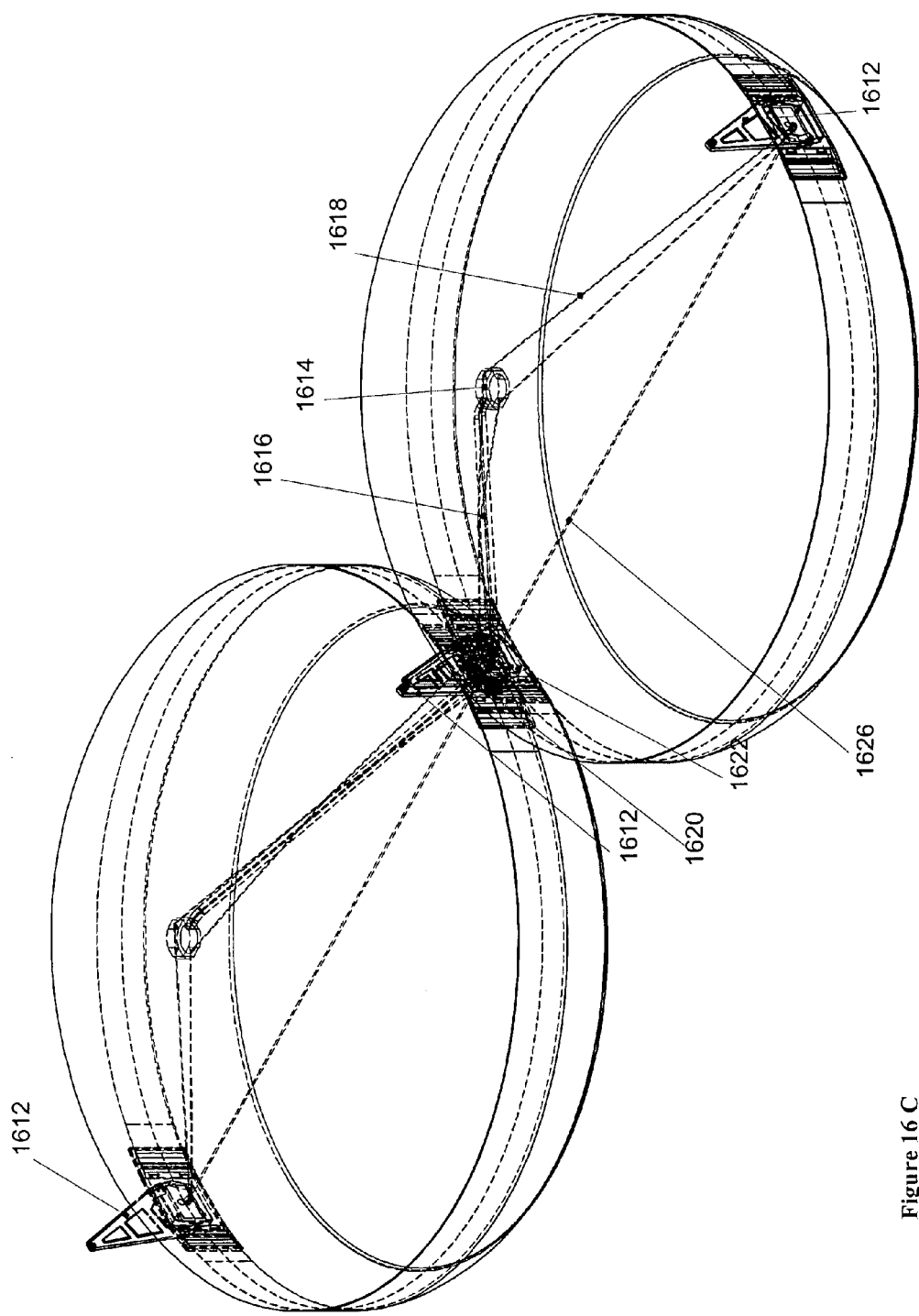

FIGS. 16A-C show concentrator, harness, tether interfaces 1612 and remote latching apparatus 1622 according to an embodiment 1600 of the present invention, with the context of control cables 1624, receiver strut (1614, 1616, and 1618), and strut coupler 1620. The tether interfaces pivot at 1602. An extension arm is free to pivot about 1604 such that out of plane motion of the cables or tracking apparatus 1624 does not deflect the concentrator. To optimize other design elements, pairs of concentrators are coupled together in this design.

During parts of the day, the outer tether of one or the other concentrator is located conveniently for service access. Electrical, water, and air interconnects run along the axis between the concentrators.

The servicing of a concentrator according to the present invention is envisioned to include one or more of the following steps, not limited to the order presented:

1. Wait until a time of day or night when the array is rotated to provide for convenient access to the outer tether structure (FIG. 16A: 1606).
2. Make disconnections at the conveniently accessed side of the concentrator, e.g., disconnect mechanical fasteners at (FIG. 16A: 1610) and release the cable (FIG. 16C: 1626) from its seat (FIG. 16A: 1608). This step may require the use of a tool to shunt the cable tension.
3. Release the latch or mate at the remote side of the concentrator (FIG. 16C: 1622), e.g., by loosening the cable (FIG. 16A: 1604; FIG. 16C: 1626).
4. Move the concentrator assembly away from the latch (FIG. 16C: 1622) and receiver strut (FIG. 16C: 1614, 1616, 1618) so the concentrator and harness is free of the tracking and pointing assembly.
5. Remove the old films from the concentrator assembly, e.g., peel an adhesive bond between the film and the harness.
6. Align and fix, e.g., via adhesive, tape, Velcro, mechanical means, etc. alignment features on a new concentrator film assembly to their corresponding elements on the harness (e.g., FIG. 12C: 1204).
7. Seal the films to a region encompassing a large feed through in the harness to be used for filling. Prepare for inflation, if needed, e.g., by piercing the films within this feed through to allow inflation. Alternatively, a port in the film could be precut or a check valve assembly could be incorporated in the film to assist with filling. To avoid having extra feedthroughs, it is preferred to use the same port to inflate the films initially as is used for some other function, e.g., passing the receiver into the films, (e.g., FIG. 13B: 1310).
8. Lightly inflate the films so that the concentrator is near its final configuration, but that joints and seams are not overstressed.
9. Adjust the inflated film alignment as needed.
10. Apply adhesive or otherwise mate the aligned balloon films to the harness to distribute the loads across the film and seal all ports in the film to the harness assembly. As described elsewhere, this could involve the use of pressure-sensitive tapes, etc. In a preferred embodiment, mating of the films to the harness uses a liquid adhesive having a set up time of several seconds to minutes or longer so some readjustment is possible after the adhesive is applied.
11. Insert a tool through a feedthrough (e.g., FIG. 16A: 1610) to guide cables, etc. through the interior of the concentrator assembly and attach these cables temporarily to the tool.
12. Withdraw the tool while guiding the concentrator assembly back up onto the tracking assembly (FIG. 16C: 1614, 1616, 1618). As shown in FIG. 14B, guide features 1412 can facilitate alignment and smooth motion of the assembling during this stage.
13. When the concentrator assembly is in position, actuate the remote latch.
14. Make connections at the accessible side of the concentrator (FIG. 16A: 1606) to complete the reinstallation.

Note that the concentrator assembly has a relatively large port through which the receiver strut and other latching devices must pass. Air leaking out of this port could complicate installation. One remedy is to continue to blow air into the concentrator during assembly. Another is to limit the exiting airflow through the use of flexible septa, bladders, check valves, trapdoors, etc. Airflow could similarly be restricted using a plug tool that is removed for re-use.

The ring may optionally include elements such as slots, tabs, eyelets, and the like to assist with film alignment and balloon installation. The harness must further provide an interface to the mechanical tether that positions and orients the balloon.

This tether interface, and the arrangement of tethers on the concentrator assembly, can take a number of forms. However, there are generally a total of at least three tether points disposed about the balloon. Particular arrangements include the use of two oppositely disposed tether interfaces having two tether points each. One tether point is kinematically redundant, but prevents wind loads from producing excessive torques on the balloon and harness, which could affect concentrator performance and balloon robustness. Alternatively, three tether interfaces disposed about the harness, e.g., at ~120 degree spacing or ~90 and 90 degree spacing, could each contain at least one tether point. A tether interface having only one tether point could be simply a reinforced or otherwise normal location on a harness ring.

Alternately, four tether interfaces each having at least one tether point could be disposed about the harness, e.g., at ~90 degree spacing. An advantage of the use of four such tether interfaces instead of the kinematically minimal three is the ability to reduce warpage of the balloon produced by wind loads, etc. and to facilitate an orthogonal balloon pointing system. One cost is additional material, which may be offset if the extra tether interfaces reduce the strength requirements of the ring or rings.

Additional tether interfaces could be employed, e.g., to interface to a penta- or hexa-podal positioning system. The use of many tether redundant tether interfaces can distribute the load and actually obviate the use of a continuous ring on the harness, however the cost and mechanical complexity of such a system may not be justified.

By definition, the tether points on the tether interface make a connection to the tether. In some preferred embodiments, these tether points are free to pivot over a limited or unlimited angular range. The tether points in the embodiment in FIG. 9 are tilted at 30 degrees with respect to the balloon. This tilt bias can provide for reduced stress and better control authority in higher latitudes by improving the lever arm. A preferred range for this tilt is between 10 and 30 degrees but could be as high as 0 degrees (aligned normal to the circumference) to 90 degrees (aligned with the circumference), since considerations other than the latitude may drive the optimizations, e.g., minimizing cost or avoiding mechanical interferences. The harness assembly is also shown with accommodation for the receiver assembly. Such accommodations include feedthroughs (shown), receiver assembly tie downs, e.g., eyelets, holes, slots, tabs, rivets, and other means widely known in the art.

A preferred embodiment of the ring is a thin sheet-metal, plastic, or composite strip which is flexed into shape in the field. Because the circumference of these balloons can be large, it is preferred for distribution purposes that multiple strips have provision to be installed to form the ring in the field. Alternatively, the ring can be made from stock contained on a roll in an operation that may also include forming steps to generate a desired cross-section and hoop shape.

The force from the tether points are communicated to the ring. It is possible for the tether points to fall on the ring, obviating a separate tether interface support element. However, except at high latitudes, this will generally require the ring to be wider and consequently use more material than necessary. Preferred embodiments of the tether interface support element include
1. sheet metal, plastic, or composite flange, as shown;
2. a truss network punched or molded from such a flange to minimize material use,
3. a plurality of rigid beams assembled in a truss to support the tether points, or
4. a combination of one or more compression beams and tensile rigging cable.

These support elements could include a discrete adjustment of the tilt bias angle via, e.g., an arc of holes or slots into one or more of which pins, spring tabs, rivets, screws, bolts, or other mechanical fasteners pass to maintain a selected bias angle. It is also possible to adjust the tilt angle continuously, e.g., using slots or clamps, provided they are sufficiently sturdy to survive wind loads without losing their setting. A combination of discrete adjustment and fine continuous adjustment may be used to accommodate for minor pointing errors produced by manufacturing or installation inaccuracy.

The position of the tether points on different tether interfaces may similarly require adjustment to accommodate for pointing errors. Again, the design of the adjustment can be sufficiently rugged to retain its setting over time. For reduced mechanical complexity and cost, a preferred alternative is to make adjustments to the film position relative to the ring before fully engaging the balloon interface (e.g., taping, gluing, or peeling off an adhesive cover). Such adjustments could also be accommodated by elements of the solar-tracking system.

FIG. 10 shows another embodiment of a balloon harness assembly in accordance with the present invention. FIG. 10 shows a battened balloon, but this arrangement is also suitable for unbattened balloons. Two rings are used to hold the balloon. The relative ring positions are maintained via a ring linkage. The ring linkage can be made from formed sheet metal (as shown), molded or formed plastic, or a composite. The ring linkage could alternatively be assembled from a plurality of truss members or a combination of at least one compressive truss member and tensile rope, cable, or wire, or the assembly can purely use the inflation pressure of the balloon to tension ropes, cables, or wire between the rings. The tether points can either lie directly on the rings or on elements of the ring linkage. A preferred ring geometry is a hoop formed from a tube or extrusion. A preferred balloon interface with the ring is, again, an adhesive tape strip, a pre-assembled adhesive on the balloon film, or a glue. If the two-ring linkage is used with a battened balloon, it is preferred to use the batten as an assembly guide and possibly to connect mechanically directly to the batten rather than to a separate adhesive joint. Alternatively the rings can connect to the balloon film via mechanical features attached to the film like those used in mechanically resealable plastic bags.

Assembly of the Plastic Film

The assembly of film or foil balloons and other plastic films is known, but several aspects of the inflatable concentrator complicate the assembly approach. Conventional foil balloons are constructed by co-extruding a heat-seal polymer (usually a polyethylene/vinyl blend) on the base polymer (usually nylon) of the films for the balloon. The adhesive sides are then rolled out together and heat sealed. Thus the adhesive layer completely coats the film in the interior of the balloon. This adhesive layer typically diffuses the reflected light and scatters the transmitted light too much to be a viable assembly approach. It is possible to reduce the amount of scattering of the adhesive by e.g., by reflowing it thermally or rolling it against a polished surface, adjusting the adhesive formulation, or a combination of these improvements over the existing art.

One alternative solution is to apply the adhesive only to the reflective film, assemble the balloon normally, providing some extra time and pressure for the heat-seal adhesive to diffuse into the clear film at the bond and then invert the balloon (turn the inside out). However, this method of manufacturing may not be favorable for mass production.

A preferred alternative is to apply the adhesive in a roller, spray, or silk-screen application to a ring on one or both films, specifically to the metallized side of the film, if that film is coated. The films are then sandwiched together with the metallized side on the inside and the bond is made by applying heat and pressure around the rim. Because of the large diameter of these balloons, e.g., up to several meters, the heat and pressure may best be applied via a hot roller or ultrasonic welder on a rotating arm or computer-controlled traverse.

An embodiment of a bonding procedure according to the present invention includes one or more of the following steps, performed in an order not limited to that shown:
1. corona, plasma, flame, or abrasion treating the clear film along the surface to be bonded;
2. applying a primer, e.g., based on polyethyleneimine (PEI) to the clear film surface;
3. applying a thermoplastic hot-melt or heat-sealing adhesive, e.g., polyethylene, EVA, acrylic, etc. to the surface. This adhesive could be formulated, if necessary to bond aggressively to the metallization of the reflective film or the native polymer of the reflective or clear film. It could also be applied in one step with primer molecules and the adhesive could be dispersed as a particle suspension. Alternatively, an adhesive mixture could be sprayed or deposited in a molten state;
4. corona, plasma flame, chemical, and/or abrasion treating the reflective film to enhance bond strength. This treatment could be aggressive enough to remove the metallization entirely if films having a weak metallization bond are employed; and
5. heat sealing the prepared films together.

Other possible adhesives include reactive polyurethane hot melts. Other bonding techniques, e.g., ultrasonic and rf welding, etc. are known in the art and can be used alternatively or in combination with heat sealing.

Laminates of different materials are often more favorable as vapor barriers, etc. than a single-component film. The use of engineered film laminates for improved performance and lifetime is envisioned. Suitable films include PET (polyester), APET (amorphous polyester), BOPA (nylon), BOPP (polypropylene), vinyl, acrylic, KORAD, polycarbonate, and fluorinated films, e.g., TEFZEL, TEDLAR, polyvinylfluoride. Suitable metals for the reflective surface include aluminum, silver, gold, platinum. Alternatively, the films could employ a multi-layer dielectric mirror. The lifetime benefits of the use of UV inhibitors, hindered amine light stabilizers (HALS), and other protectants may justify their cost.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An apparatus comprising:
an upper elliptical film panel configured to transmit incident light;
a lower elliptical reflective film panel configured to reflect incident light and having a circumference joined substantially to a circumference of the upper film panel, such that inflation of the joined upper and lower film panels creates a balloon that reflects incident light transmitted through the upper film to a receiver disposed at a focal point inside the balloon, wherein the lower elliptical reflective film panel is substantially flat when the balloon is not inflated and is deformed to reflect light to the focal point when the balloon is inflated; and
a flexible harness coupled to the balloon and in contact with the balloon at a plurality of contact points, the flexible harness distributes a first force on the balloon over the plurality of contact points on the balloon;
wherein the first force on the balloon is generated by a tether in response to a second force acting on the balloon;
wherein the flexible harness is under tension to resist an outward force exerted on the flexible harness by pressure from the inflated balloon; and
a rigid positioner coupled to the flexible harness through the tether, the rigid positioner fixedly positioned and tethered to the balloon through the flexible harness to support the balloon against the second force.

2. The apparatus of claim 1 wherein a rigidity of the balloon is maintained by an inflation pressure inside the balloon.

3. The apparatus of claim 2 wherein the rigidity is attributable solely to the inflation pressure.

4. The apparatus of claim 2 wherein one-half or greater of the rigidity is attributable to the inflation pressure.

5. The apparatus of claim 1 wherein the upper and lower film panels exhibit a circular shape.

6. The apparatus of claim 1 the harness is configured to tether the balloon to an object.

7. The apparatus of claim 1 further comprising a wrinkled region of the balloon located above the batten.

8. The apparatus of claim 7 wherein the batten is rigid, in compression, and resists inward forces.

9. A method of collecting solar energy comprising reflecting light incident to a clear upper panel of an inflated balloon, on a receiver disposed at a focal point interior to the balloon utilizing a reflective lower panel of the balloon as shaped by a batten extending around the balloon at a point below an equator of the balloon, wherein the reflective lower panel is substantially flat when the balloon is not inflated in the balloon and is deformed to reflect light to the focal point when the balloon is inflated;

providing a flexible harness around the balloon, the flexible harness is coupled to the balloon and in contact with the balloon at a plurality of contact points, the flexible harness distributes a first force on the balloon over the plurality of contact points on the balloon;

anchoring the inflated balloon to ground through the flexible harness and a rigid positioner to support the balloon against a second force;

wherein the rigid positioner is fixedly positioned;

wherein the first force on the balloon is generated by a tether in response to the second force acting on the balloon; and wherein the flexible harness is under tension to resist outward forces exerted on the flexible harness by pressure from the inflated balloon.

10. The apparatus of claim 1 wherein one of the upper film panel or the lower film panel is modified by a chemical treatment.

11. The method of claim 9 further comprising stretching the balloon by application of a pressure difference.

12. An apparatus comprising:

an upper elliptical film panel configured to transmit incident light;

a reflective lower elliptical film panel configured to reflect incident light and having a circumference joined substantially to a circumference of the upper film panel;

a batten bonded or installed onto the reflective lower panel at a circumference of between 30 and 80% of an uninflated film circumference such that inflation of the joined upper and lower film panels creates a balloon that reflects incident light transmitted through the upper film to a receiver disposed at a focal point inside the balloon, wherein the lower elliptical film panel is substantially flat when the balloon is not inflated and is deformed to reflect light to a focal point when the balloon is inflated;

a flexible harness in contact with the balloon at a plurality of contact points, the flexible harness distributes a first force on the balloon over the plurality of contact points on the balloon;

wherein the first force on the balloon is generated by a tether in response to a second force acting on the balloon;

wherein the flexible harness is under tension to resist outward forces exerted on the flexible harness by pressure from the inflated balloon;

wherein the batten is rigid, in compression, and resists inward forces; and a rigid positioner coupled to the flexible harness through the tether, the rigid positioner fixedly positioned and tethered to the balloon through the flexible harness to support the balloon against the second force.

13. The apparatus of claim 12 wherein the batten is configured to withstand only high-order buckling instabilities.

14. The apparatus of claim 1 further comprising a batten that supports a shape of the balloon, the batten extending around the balloon at a point below an equator of the balloon.

15. The apparatus of claim 1 wherein the batten is bonded or installed onto the reflective film at a circumference of between 30 and 80% of an uninflated film circumference.

16. The apparatus of claim 1 further comprising a rigid first ring and a rigid second ring, the rigid first ring and the rigid second ring are separated and coupled by a ring linkage, the ring linkage is configured to accommodate the receiver.

17. The apparatus of claim 16 wherein:

the rigid first ring is disposed above the equator of the balloon and supports the upper elliptical film panel that transmits incident light; and the rigid second ring is disposed below the equator of the balloon and supports the lower elliptical reflective film panel that reflects light.

18. The method of claim 9 wherein the batten is rigid, in compression, and resists inward forces.

19. The apparatus of claim 1 wherein the second force, which acts on the balloon, is selected from the group consisting of wind force, gravitational forces, and inertial forces.

* * * * *